United States Patent [19]

Anderson et al.

[11] Patent Number: 5,509,349

[45] Date of Patent: * Apr. 23, 1996

[54] BEVERAGE VALVE VENTURI APPARATUS

[75] Inventors: Kyle T. Anderson, Issaquah; Duke W. Goss, Kirkland; Michael G. Lee, Redmond, all of Wash.

[73] Assignee: Caffe Acorto, Inc., Bellevue, Wash.

[*] Notice: The portion of the term of this patent subsequent to May 4, 2010, has been disclaimed.

[21] Appl. No.: 47,967

[22] Filed: Apr. 15, 1993

Related U.S. Application Data

[63] Continuation of Ser. No. 543,157, Jun. 25, 1990, Pat. No. 5,207,148.

[51] Int. Cl.$^6$ .................................................. A47J 31/44
[52] U.S. Cl. ..................... 99/323.1; 99/452; 137/889; 137/893; 261/62; 261/79.2; 261/DIG. 16; 261/DIG. 76; 366/163.2; 366/165.4
[58] Field of Search ..................... 99/275, 279, 280–283, 99/285–287, 289 R, 290, 291, 293, 297, 299, 302 R, 302 P, 323.1, 323.3, 452, 453; 426/433; 261/62, 79.2, DIG. 16, DIG. 76; 366/163, 165, 176; 137/889, 893, 897, 896

[56] References Cited

U.S. PATENT DOCUMENTS

| | | | |
|---|---|---|---|
| 610,873 | 9/1898 | Collis | 137/625.48 |
| 828,086 | 8/1906 | Bowers | 137/625.4 |
| 2,014,325 | 9/1935 | Grilli | 99/286 X |
| 2,658,645 | 11/1953 | Harris, Jr. | 222/129.4 X |
| 2,680,802 | 6/1954 | Bremer et al. | 222/129.1 X |
| 2,682,984 | 7/1954 | Melikian et al. | 221/96 |
| 2,827,845 | 3/1958 | Richeson | 99/282 |
| 2,907,265 | 10/1959 | Bastian | 99/289 X |
| 2,957,607 | 10/1960 | Smith | 222/129.4 |
| 3,100,585 | 8/1963 | Nail et al. | 222/129.1 X |
| 3,385,569 | 5/1968 | Bookout | 222/129.4 X |
| 3,390,626 | 7/1968 | Holstein et al. | 99/283 |
| 3,599,833 | 8/1971 | Reichenberger | 222/129.1 X |
| 4,123,800 | 10/1978 | Mazzei | 366/165 X |
| 4,242,568 | 12/1980 | Wunderlin et al. | 99/280 X |
| 4,406,217 | 9/1983 | Oota | 99/286 X |
| 4,484,515 | 11/1984 | Illy | 99/282 |
| 4,715,274 | 12/1987 | Paoletti | 366/176 X |
| 4,735,133 | 4/1988 | Paoletti | 99/323.1 X |
| 4,779,519 | 10/1988 | Giuliano | 137/893 X |
| 4,815,633 | 3/1989 | Kondo et al. | 221/96 X |
| 4,852,474 | 8/1989 | Mahlich et al. | 99/293 |
| 4,921,640 | 5/1990 | Wu | 99/293 X |
| 4,922,810 | 5/1990 | Siccardi | 99/293 X |
| 4,945,824 | 8/1990 | Borgmann | 99/293 |
| 4,949,631 | 8/1990 | Fregnan | 99/452 |
| 4,960,042 | 10/1990 | Grossi | 99/293 |
| 4,970,948 | 11/1990 | Giannelli | 99/286 X |

FOREIGN PATENT DOCUMENTS

| | | | |
|---|---|---|---|
| 328704 | 8/1989 | European Pat. Off. | 99/280 |
| 3829326 | 3/1990 | Germany | 99/293 |
| 449097 | 6/1949 | Italy | 366/163 |
| 6038028 | 2/1985 | Japan | 366/165 |

*Primary Examiner*—Charles E. Cooley
*Attorney, Agent, or Firm*—Daniel T. Anderson

[57] ABSTRACT

A fully automated cappuccino, latte, and espresso brewing machine which includes a refrigerated milk supply from which milk is drawn by a steam driven venturi apparatus. The venturi subcombination includes independently electrically operated valving for the driving steam, for drawing milk from its supply, and for drawing air, as desired, for foaming the milk in a vortex mixer coupled to the output of the venturi. The valving may be sequential so that with each cycle of use of the apparatus, it is hygienically steam cleaned of all milk residue.

10 Claims, 29 Drawing Sheets

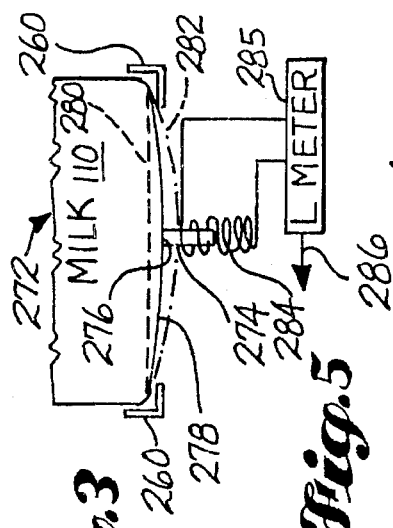
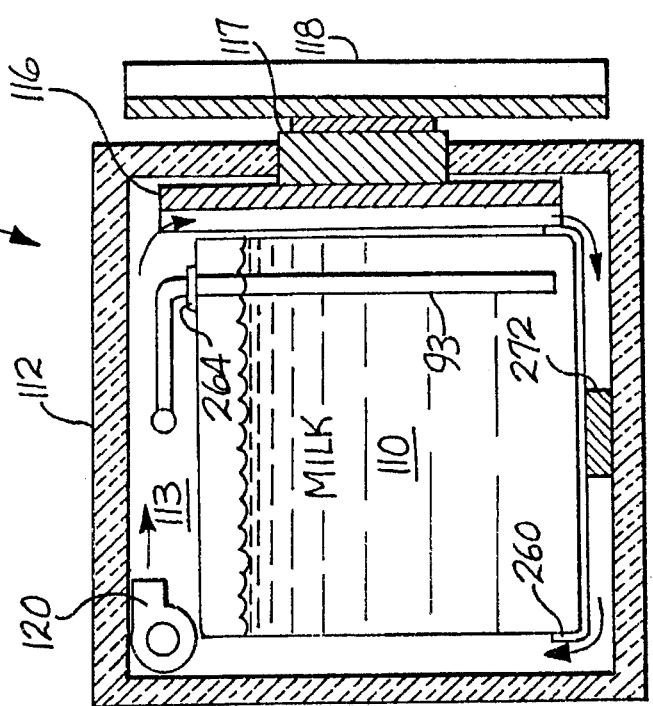
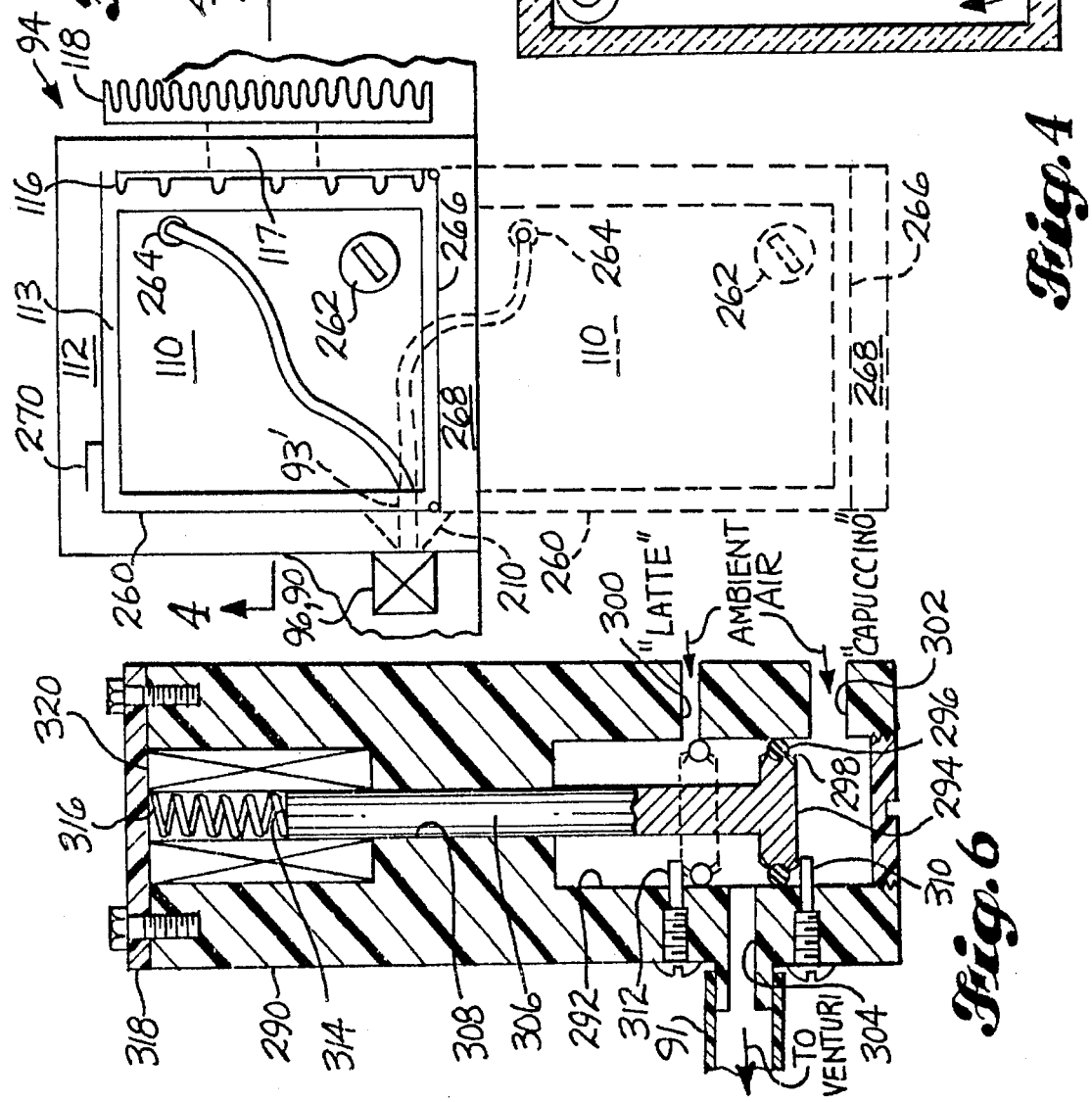
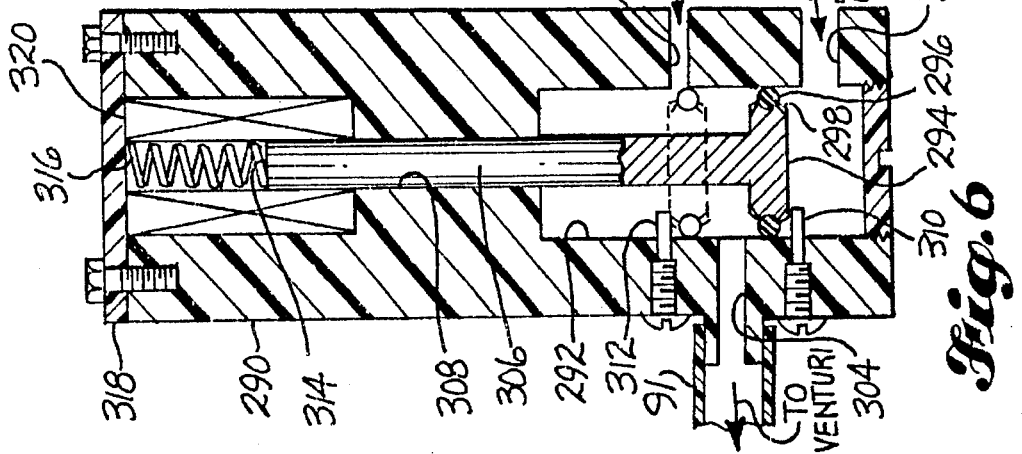

OPERATOR CONTROL PANEL 342

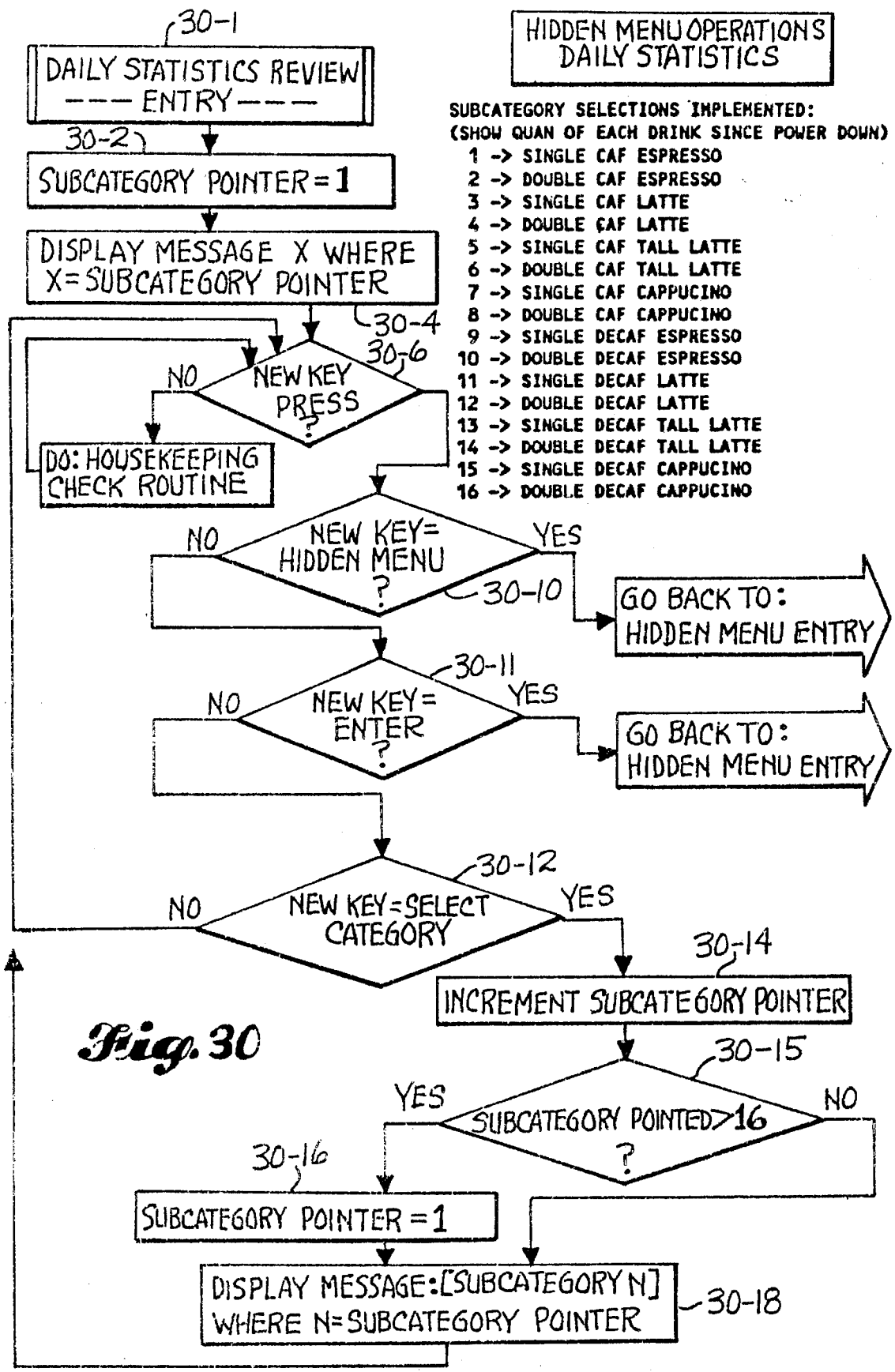

BEVERAGE VALVE VENTURI APPARATUS

This is a continuation of application Ser. No. 07/543,157 filed on Jun. 25, 1990, now U.S. Pat. No. 5,207/148.

BACKGROUND OF THE INVENTION

This invention relates generally to espresso coffee making and more particularly to a system and method for providing and serving, fully automatically, such coffee beverages as espresso, care lane, cappacino, and the like, from roasted whole beans.

The practice of brewing espresso and making and serving steamed milk inclusive beverages such as cappuccino or latte is a relatively highly developed field; and the prior art includes devices for grinding the special beans and brewing, largely automatically, a basic espresso liquor. Significant skill is generally required, however, on the part of the operator to measure the beans, pack the precise charge of ground coffee into the brewer cylinder with a precise magnitude of compressive force, and apply water to the cylinder in the precise quantity, temperature, and pressure for a precise time period to create a desired measure of the liquor at a satisfactory sealing temperature with a consistent quality of the resultant beverage. If the finished drink is to be milk inclusive, the operator then draws milk from a refrigerated source, operates a steam wand from a high temperature, pressure source to aerate and heat the milk before blending it with the coffee liquor.

Properly handling the cold milk and the dangerous steam, obviously requires a further set of skills; and a fully skilled operator with state of the art equipment can be expected to require approximately one minute to prepare and serve the drink.

It may be noted that the problem of acquiring and practicing these skills is aggravated by an observed perfection expectation characteristic on the part of espresso clientele. Restaurants and stores that make and serve espresso typically expect to provide substantial time in training and require the mastery of an extensive instruction manual, to train an espresso machine operator.

This time and labor factor often causes a restaurant to "close down" a potentially highly profitable espresso operation during rush periods because unless extra operators are hired for the period and unless there is a adequate number of brewing machines available, service congestion and customer frustration create ill will among and between service and customer personnel.

Inherent in the difficulties indicated above and the level of skills required to master them satisfactorily is the milk safety problem. Because of the dangerous bacteria culture bed that milk provides when not refrigerated, even a microscopic quantity of warm milk must not be left in the machine. Accordingly, milk is typically poured manually from a refrigerated supply into an open glass or metal beaker where it may be treated by the steam wined. The open vessel and the wand must then be frequently thoroughly claimed to prevent the deleterious growth of bacteria.

The problems and difficulties, and costs incumbent therewith, have severely retarded the popularity growth of espresso and its associated beverages because of profit risk and the danger of the milk handling.

It is therefore an object of the present invention to provide a fully automated espresso method and system that is not subject to these difficulties and limitations of the prior art.

It is another object to provide such a system and method which reliably provide consistent quality of espresso beverages.

It is another object to provide such a method and system in which temperature, quantity, pressure, and tinting of water, steam, coffee beans, and milk at even significant point in the system is essentially continuously monitored computer controlled.

It is another object to provide such a system and method in which a supply of milk is stored and refrigerated within the apparatus.

It is another object to provide such a method and system in which milk is automatically drawn from the refrigerated supply as needed for each serving and in which no residue of non-refrigerated milk is left in the apparatus after each serving.

It is another object to provide such a method and system which reliably consistently and rapidly repeatedly delivers a milk inclusive hot espresso beverage from whole roasted beans every 15 to 25 seconds.

It is another object to provide such a method and system which is fail safe in its handling of steam, hot water, electrical power, and milk.

It is another object to provide such a method and system in which the operator's only function during normal operation is to make a drink selection by pressing an appropriate button on the control panel of the apparatus.

It is another object to provide such a system which is rugged and reliable and readily and economically maintained.

SUMMARY OF THE INVENTION

Briefly, these and other objects are achieved in accordance with features of an example of the invention which include a master controller comprising a microprocessor and which further includes in cooperative relation the following major subsystems: at least one coffee bean hopper and an associated coffee grinder for providing a measured charge of coffee; a brewer assembly, which receives the charge of ground coffee, packs it and retains it in compression within a brewing cylinder between a plunger and grounds ejection means, injects pressurized hot brewing water through the coffee, extracts the brewed liquor and delivers it to the serving/drinking cup, and then ejects the spent grounds into a waste container; a steam operated air-milk venturi-mixer assembly which draws in liquid milk and ambient air :red steam whips, aerates, the milk into a heated froth and delivers it to the drinking cup with the espresso liquor thereby forming a milk-inclusive hot espresso drink within the serving cup; a refrigerated milk supply assembly mounted adjacent to the venturi-mixer assembly and having the milk inlet portion thereof disposed within the refrigerated envelope of the milk supply assembly. A milk reservoir is provided within the refrigerated envelope and may be withdrawn therefrom for resupply of the milk; a water heater for supplying hot brewing water at high pressure; a stream generator for supplying very hot steam at a relatively low pressure for steaming the milk and steam cleaning of non-refrigerated milk contacting surfaces; a power supply for providing various voltages of AC and DC power to energize: 1) electromechanical elements such as motors, fans, solenoid actuators, and pumps, 2) thermoelectric elements such as heaters and refrigeration devices, and 3) solid state electronic circuitry, sensors, and indicators. A significant aspect of the combination is that the venturi and refrigeration assemblies include means whereby all milk contacting surfaces are either within the refrigeration envelope or are automatically steam cleaned after, and as a phase of, each milk handling cycle by the steam venturi.

DESCRIPTIVE LISTING OF FIGURES IN THE DRAWINGS

FIG. 3 is a plan view of the milk supply drawer assembly of the combination shown in FIG. 1;

FIG. 4 is a cross-sectional view of the structure shown in FIG. 3 taken along the reference lines 4—4 thereof;

FIG. 5 is a schematic view of an example of a milk level sensing device;

FIG. 6 is a longitudinal sectional view of the 2-way air valve assembly of the combination shown in FIG. 1;

FIGS. 24 through 30 are examples of hidden menu routines that provide for additional, optional functions of the apparatus and are enabled by a user actuated hidden key on the control panel of FIG. 9.

DETAILED DESCRIPTION OF A PREFERRED EMBODIMENT

Figure 1:
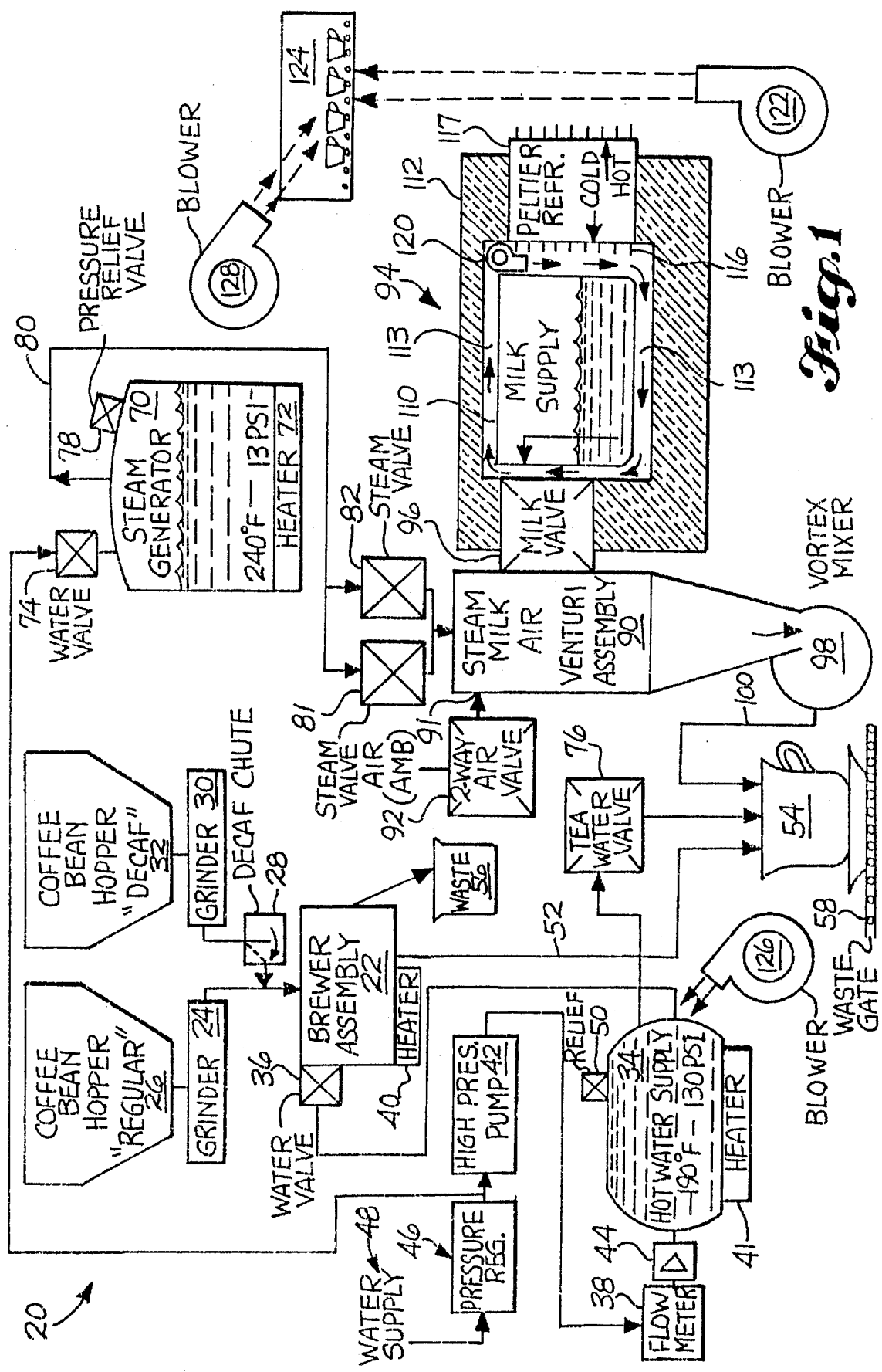
FIG. 1 is an overall diagram illustrating the physical components of an example of the combination of the invention.

In accordance with the structural, mechanical aspects of the invention, details of method and apparatus being discussed infra, the example of an automated espresso machine 20 shown and described includes a unitary console housing, not shown, within which is mounted a brewer assembly 22. A satisfactory such assembly is commercially available as "Brewer Group" Model 01.00524 by I.M.C., s.r.l. of Bergarno, Italy. Its essential components include a brewing cylinder into which a measured charge of ground coffee is placed by gravity feed from a grinder assembly 24 which receives its measure of roasted beans from a "Regular" hopper 26. When desired, a solenoid operated decaf chute 28 is activated to couple the brewer assembly 22 to a decaf grinder assembly 30 which receives its supply of roasted decaf beans from "Decaf" hopper 32. The grinder assemblies 24, 30 may each, for example, be "Grinder Group" Model 01.00527 by I.M.C., s.r.l.; and decaf chute 28 may be "Chute Group" Model 37.00118 by I.M.C., s.r.l..

The brewer assembly 22 further includes a piston or plunger which compresses the grounds to a predetermined degree by operation of its electric motor controlled by a reaction force feed-back signal provided by a compression spring and microswitch between a piston carrier and the piston itself. While thusly compressed with the predetermined force, the hot brewing water is supplied at high pressure from a water heater vessel 34 through a solenoid operated brew water valve 36. A flow meter 38, which may be "Turbine Flow Meter" Model 95.01205 by I.M.C., s.r.l., provides an electrical signal indicating quantity of water flow into the water heater and hence into the brewer cylinder and forced through the packed coffee, the electrical signal being utilized as described infra to close the valve 36 when the desired amount of pressurized hot water has traversed the flow meter 38. In accord with a presently preferred set of brewing parameters, a brewer heater 40 maintains, quiescently, the brewing cylinder at a temperature of approximately 185° F.; a water heater 41 maintains the vessel 34 at 190° F.; a pressure of 130 psi is achieved with a high pressure pump 42 and a check valve 44; and a pressure regulator 46 maintains a predetermined pressure of the order of 40 psi in the inlet line for the pump from an external water supply indicated at 48. A mechanical safety relief valve 50 may be incorporated to relieve vessel pressure over 150 psi.

The hot brewing water metered through the solenoid valve 36 is carried by a flexible pressure line to the interior of the plunger and thence through its foramenated face into the coffee pack. The base of the brewing cylinder is also a plunger, normally fixed during the brewing phase, with a very finely foramenated body to pass the brewed liquor, as forced by the pressurized brewing water, and then deliver it by gravity through the line 52 to the serving cup 54. At the end of the brewing phase, the lower plunger is driven upwardly to eject the spent grounds cake into a waste receptacle 56. The brewing assembly may be programmed then to operate a cleaning cycle during which the cylinder and both foramenated pistons and line 52 are flushed with a charge of hot water through the valve 36. The cleansing water passes through a waste grate 58 into a receptacle, not shown. It may be noted that such a cleaning cycle is normally rarely utilized and may be programmed, for example, at operator discretion. A hot water outlet valve 76 provides water on demand as for tea or cleaning purposes or the like.

For making steamed milk-inclusive espresso beverages, a steam generator vessel 70 is provided with an electric heater 72 to heat water in the vessel to a temperature of, for example 240° F. at a pressure of 14 psi, or approximately one atmosphere, gage pressure. Water from the supply 48 is provided through an inlet solenoid actuated valve 74. A mechanical safety relief valve 78 affixed through the wall of vessel 70 releases steam pressure when it exceeds, inadvertently, approximately 15 psi. An outlet line 80 carries live steam from the vessel 70 through either or both of a pair of solenoid valves 81, 82 to the steam driven venturi assembly 90 which is explained infra in connection with the description of FIG. 2; in overall function, however, the venturi draws 1) ambient air through an orifice 91 in the venturi and 2) liquid milk from a flexible output tube 93 in a refrigerated milk supply 94 by means of a solenoid valve 96. The steam valve 81 has a lesser flow rate than steam valve 82 and may be considered the "latte" control; while the latter with its higher rate is utilized when "capaccino" is to be prepared. When desired, both may be opened for maximum flow as, for example, in the cleaning phase of each serving cycle. The output of the venturi in any case cooperates with a vortex mixer 98, also driven by the steam from the generator 70, which blends the programmed mix of air, steam, and milk into a foam which is delivered directly to the serving cup 54 through a steamed milk tube 100. The refrigerated milk supply 94 is explained in more detail in connection with the description of FIGS. 3 and 4 infra, it being sufficient here to note that, in this example, a milk vessel drawer 110 is slidingly retained within an insulated housing 112 and is provided with an air flow passage space 113 around its surfaces. A refrigeration mechanism which in this example may be a Peltier effect device 117 is disposed as shown with its "cold" surface inside the housing and its "hot" surface outside. Heat from the space 113 is carried through a set of heat exchanging fins 116 within the housing, through the set of Peltier thermoelectric chips 117 and to a set of heat exchanging fins 118 disposed to project, as indicated, into the ambient air. This heat flow may be improved and the temperature gradiant in the milk supply 94 may be minimized by a small electric blower 120 mounted within the refrigerated cavity which assists the natural convection flow by forcing at least a small additional flow across the fins 116 and around the milk vessel through the space 113. Similarly, an electric blower 122 may improve the effectivity and efficiency of the refrigeration mechanism by forcing a flow of the ambient air across the external fins 118. The heat thus removed may be directed by the blower 122 to the stored serving cups 124 in order to maintain them preheated and ready for use. In like manner, excess heat from the environments of the water heater 34 and steam generator 70 may be removed and directed toward the cup storage by electric blowers 126, 128, respectively.

Figure 2:
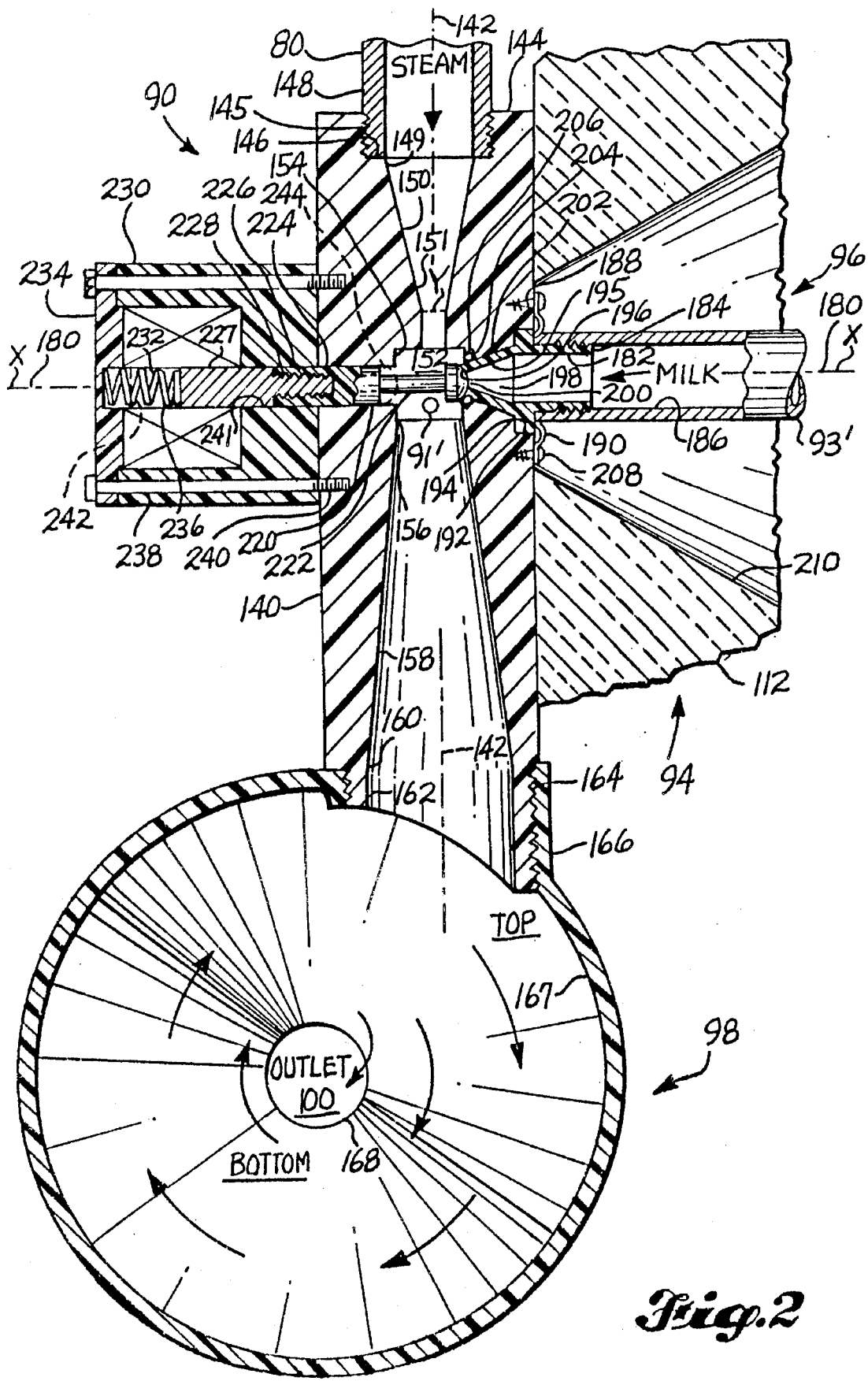
FIG. 2 is a longitudinal sectional view of a steam operated venturi-mixer assembly constructed in accordance with the principles of the invention.

Referring to FIG. 2, the steam venturi 90 has a body 140 which may be essentially a figure of revolution having an axis 142 and being formed from, for example, a high density clear plastic such as polysulfone. The clear plastic body affords an operator or inspector the ability to view its internal passages to verify that it is clean and that there is no milk residue after the cleaning phase of a serving cycle. At the input end 144, a short threaded bore 145 is provided and forms a retaining shoulder 146 for fitting the threaded end 148 of the steam line 80 the inner diameter of which preferably matches that of the beginning, larger diameter end 149 of a venturi tapered throat portion 150. The smaller diameter end 151 of the throat portion 150 matches that of a short cylindrical throat portion 152 at the output end of which is formed a larger diameter, injector throat cylindrical portion 154. The output end of the injector throat portion blends smoothly to the smaller diameter end 156 of a tapered venturi mixer throat portion 158 which increases linearly to its larger diameter end 160 where it smoothly joins a cylindrical output throat portion 162. The latter throat portion terminates with its outer surface threaded at 164 to mate with a threaded female fitting 166 in the outer portion 167 of the vortex mixer 98. The axis 142 of the venturi, preferably horizontal, is offset with respect to the vertical axis of the vortex, as shown, whereby when the steam driven mix from the venturi is injected into the vortex, it has a significant tangential component to create the vortex mixing action. The mixer has preferably the basic configuration of a funnel with the steam foamed milk mix being injected into the upper, larger diameter portion 167 and vortex mixed by the resultant swirl motion. The final foamed product then is ejected from the central, bottom portion 168 of the funnel shaped mixer and into the steamed milk tube 100 and thence driven toward the serving cup 54.

Aligned along an axis 180 transverse to and intersecting the axis 142 approximately midway along the length of the injector throat portion 154 is disposed a milk inlet apparatus 96 including a clear plastic fitting 182 having a thin-walled cylindrical portion 184 which mates, for example, by threads within the outer end 186 of the metal end portion 93' of the milk supply tube 93. Adjacent to the cylindrical portion 184 is an enlarged diameter collar portion 188 which forms a retaining shoulder 190 for the end of the tube 93' and a retaining flange 192 which fits within a mating short cylindrical bore 194 formed in the side of the venturi body 140. Inwardly from and adjacent to the collar portion 188, the fitting 182 has a tapered portion 195 which terminates in a small diameter orifice 198 which forms a milk valve seat 196 which cooperates with an opposing plunger valve body tip 200 to open or close, selectively, the milk orifice 198. A conical fitting retaining seat 202 is formed in the venturi body 140 adjacently inwardly from the bore 194 which mates with the tapered portion 195 of the fitting 182. An annular groove 204 is formed around the seat 202 contiguously to its orifice end for retaining an o-ring seal 206 to make the engagement of the fitting 182 to the venturi valve body 140 vapor and fluid tight. A set of retaining clips 208 may be provided to press the fitting 182 into its conical seat 202 in a sealed relationship therewith by compressing the o-ring seal 206. The insulation 112 of the refrigeration assembly 94 is relieved by removal of a truncated conical portion forming, diverging away from the venturi body 140, a conical void 210 which constitutes a portion of the air space 113 (FIG. 1) for the circulation of cold air over the entire milk path to the venturi. The metal end portion 93' of the otherwise flexible milk line 93 further assures refrigeration for the milk until it enters the venturi proper.

The plunger valve body tip 200 is carried on the forward end of and integrally formed with a valve stem 220 which again, for inspection purposes, is preferably formed of a clear plastic material such as polysulfone. The tip 200 may be convex dome shaped as shown for achieving a valving action with the valve seat 196. Adjacent the back of the dome shaped tip 200, the stem 220 may have a reduced diameter portion 222 extending approximately across the diameter of the venturi injector throat portion 154. The diameter of the stem 220 may then be increased for the remainder of its length to form a stem body portion 224 the rear end 226 of which, is shown internally threaded for attachment to a metal solenoid armature shaft 227 which is formed with mating external threads along its forward, reduced diameter end portion 228. The remainder of the valve actuator solenoid 230 mechanism may be conventional including a spring 232 held in compression between the rear body portion 234 of the solenoid and the rear end 236 of the armature shaft 227. The force thus exerted on the valve stem 220 causes it normally to hold the valve tip 200 in a closure relation with the valve seat 196. The solenoid 230 is held together and affixed to the venturi body 140 by a set of machine screws 238 which are shown threaded thereinto at 240. A bore 241 of a diameter to slidingly receive the value stem body portions 224,226 is provided through the venturi body along the axis 180.

It is to be noted that when the solenoid is electrically actuated in accordance with control sequencing described infra, the solenoid armature 227 is drawn back to the position indicated by the dashed line 242 further compressing the spring 232 and pulling the valve stem body 224 and the valve tip 200 away from the valve seat 196 thusly opening the milk channel 198 to the reduced pressure of the venturi injector throat 154 and essentially clearing the throat by disposing the valve tip rearwardly to the position indicated by the dashed lines 244.

To complete the detail of the venturi apparatus, the ambient air orifice 91 is a bore 91' formed transversely to and intersecting the venturi axis 142 in the injector throat portion 154 slightly downstream from the transverse axis 180 of the milk injector mechanism.

Some typical, approximate dimensions of the venturi and vortex mixer are:

| | |
|---|---|
| overall length of body 140 | 4–6 inches |
| length of tapered portion 150 | 1–2 inches |
| included angle of tapered portion 150 | 22 degrees |
| length of cylindrical portion 152 | .1–.15 inch |
| diameter of cylindrical portion 152 | .06–.10 inch |
| length of injector throat 154 | .15 inch |
| diameter of injector throat 154 | .1–.14 inch |
| length of tapered portion 158 | 3–5 inches |
| included angle of tapered portion 158 | 5–12 degrees |
| overall diameter of body 140 | 1 inch |
| included angle of milk fittings 195 | 45 degrees |
| inner diameter at top of vortex funnel | 1–1.5 inches |
| inner diameter at bottom of funnel | .375 inch |
| included angle of funnel | 90 degrees |
| height of upper cylindrical portion of funnel | 1–1.5 inches |
| height of conical portion of funnel | .5 inch |
| diameter of valve stem body 224 | .12 inch |
| diameter of air orifice 91' | .02–.06 inch |
| diameter and thickness of o-rings 206 | .25 × .125 × .0625 |

It is of interest to note, at this point in the structural description of the venturi assembly 90, milk valve 96, steam valves 81,82, and vortex mixer 98, that in the sequence of nominal operation, the steam driven venturi is operable to draw in milk when the valve 96 is open; the milk valve is then closed while one or, preferably both, of the stem valve remains open long enough to steam-cleanse all internal, milk contacted surfaces of the assemblies including the entire serving tube 100 to the cup 54, the resultant "overflow" of steam to the serving cup being, of course, totally inconsequential.

Referring to FIG. 3, the refrigerated milk supply 94 is shown in a schematic, plan view as including the milk vessel drawer 110 in place in its normal disposition within the insulated housing 112. Drawer guide hardware 260 of conventional character is indicated as supporting the vessel whether in its normal position or when pulled out, as for refilling or other servicing, as shown by the corresponding dashed lines. The vessel includes a filler cap 262 and a sealed through-fitting 264 for passage of the flexible milk outlet line 93. The drawer front 266 includes a panel 268 of the insulated housing 112. A proximity switch 270, of a conventional type, provides an electrical indication of complete mechanical and thermal closure of the drawer.

The flexible milk line 93 is connected by conventional means, not shown, to its metal end portion 93' which couples directly to the body of the milk valve 96 and venturi body 140. The conical void 210 in the insulated housing 112 is indicated about the milk outlet line 93'.

The thermoelectric Peltier device 117 is again shown in the insulated wall 112 with its cold side and heat exchange fins 116 disposed within the circulating air spaces 113 and its hot side red cooling fins 118 disposed externally.

In FIG. 4, the cross-sectional view of the refrigerated milk supply 94 again illustrates the Peltier chip 117 having, with respect to the insulated housing 112, its external "hot" fins 118 and internal "cold" fins 116. The milk vessel 110 is shown supported on the drawer guide hardware 260 anti in contact with a milk level sensor 272 to be described infra. The small fan 120 may be disposed within the space 113 to assist the natural convection flow of air around the milk vessel. The milk output supply line 93 is shown extending from near the bottom of the vessel 110, through the fitting 264, and thence toward its connection to the milk valve, venturi assemblies 96, 90.

Referring to FIG. 5, an example of the sanitary milk level sensor 272 is schematically shown as including a ferrite, or ferromagnetic, rod 274 supported in contact with the bottom center 276 of the milk vessel 110. The milk vessel is preferably molded of plastic with a relatively thin wall whereby its bottom panel 278 flexes, as indicated by the dashed lines 280,282, as a function of the weight of milk remaining in the vessel. A wire wound coil or coil set 284, is mounted to the frame of the refrigeration apparatus body whereby as the bottom of the vessel flexes up or down, the ferrite rod is inserted less or more into the coil and consequently reduces or increases, respectively, the effective electrical reluctance of the coil 284. The coil and an associated reluctance measuring circuit 285 may be of conventional design and may be readily calibrated to provide an output signal at its terminal 286 which is an accurate function of the milk level in the vessel 110.

In FIG. 6, an example of and optional two-way air valve 92 is shown which includes a body portion 290 having a valve cylinder 292 formed centrally therewithin. A valve piston 294 is disposed longitudinally slidingly within the cylinder and carries a sealing o-ring 296 in an annular retaining groove 298. A smaller air inlet bore 300 extends through the wall of the body 290 into the cylinder 292 and, longitudinally spaced therefrom, a larger air inlet bore 302 is similarly provided through the valve body 290, the longitudinal spacing of the bores 300,302 being of the order of a few thicknesses of the piston 294. Longitudinally midway between the air inlet ports 300, 302 is disposed the outlet port or bore 304 which connects by conventional means to the line 91 and thence to the orifice 91' in the venturi assembly 90.

The valve piston, 294 is carried at the forward end of a solenoid armature valve shaft 306 which is disposed slidingly in a bore 308 of like diameter through the valve body 290. The longitudinal displacement, or stroke of the shaft 306 is limited by a forward pin 310 and a rearward pin 312 threadingly disposed, as shown, through the body 290 and projecting into the cylinder 292 to form stops for the piston. At the rearward end 314 of the shaft a spring 316 is held in compression against the end plate 318 of the valve body 290. The spring normally holds the valve piston against the forward pin 310; when, however, the solenoid coil 320 is energized to actuate the solenoid armature (shaft 306), the shaft is drawn rearwardly against the pin 312 to the position indicated by the dashed lines. Hence it may be seen that in a normal state, the smaller inlet bore 300 is connected to the outlet port 304, while in the solenoid activated state, the larger inlet port 302 is connected to the outlet port 304. The overall function of the two-way air valve 92, as an alternative to the plurality of steam valves 81, 82 is for additional program flexibility, when desired, is to select between two rates of air intake for the venturi, which, as noted supra, draws in ambient air as well as liquid milk to be mixed together with the steam to form the foamed milk output. When, for example, a "latte" beverage is desired, the solenoid may be left in its normal, inactivated state; and when a "capaccino" beverage is desired requiring more air, the solenoid may be activated to permit a larger flow of air through the larger port 302. These ports are labeled "latte" and "capaccino", respectively, on the drawings, but it is to be understood that, as discussed, supra, the latte-cappacino selection function may be preferably achieved by the programming of the steam valves 81,82.

Figure 7:
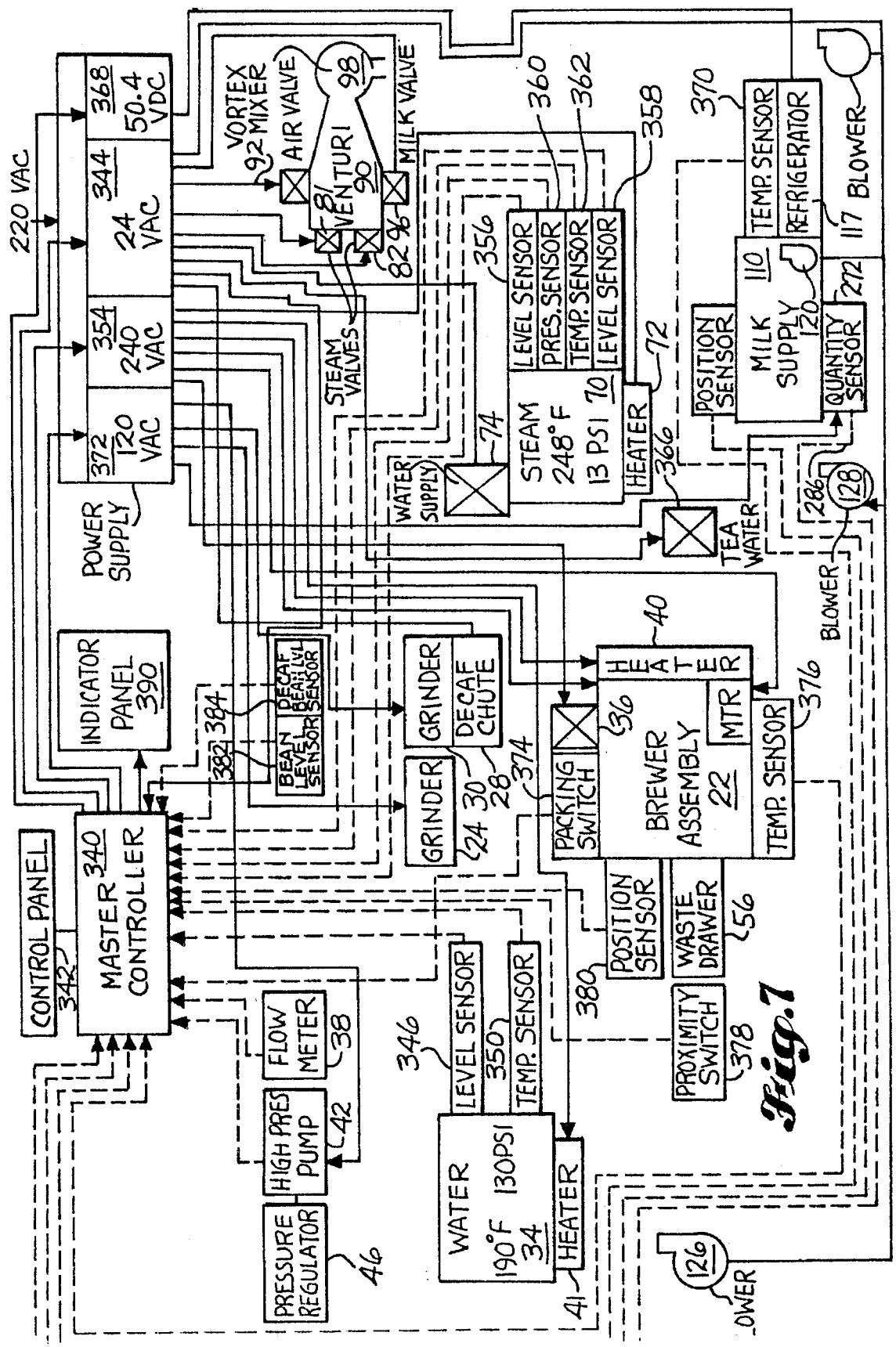
FIG. 7 is an overall diagram illustrating the electrical components, and their interconnections, of the combination shown in FIG. 1.

Referring to FIG. 7 the electrical components of the system of FIG. 1 and their interconnections are depicted. Basically, a master controller 340 monitors and receives electrical signals from an operator's control panel 342 and from the various electronic, electromechanical, red thermoelectric components as well as from internal timers and sequences and provides output, control signals to power supply units to energize and activate the electrical components in accordance with predetermined desired magnitudes for their associated functional parameters such as pressure, temperature, How rate, integrated flow, static quantities, timing or time sequencing, position, force, as well as voltage, current and light levels. Accordingly, the master controller 340 receives instructional or querying signals from the operator's control panel 342. The functions of the master controller 340 in response to such input signals is described infra.

The flow meter 38 provides a signal indicating quantity of water flow therethrough, tiffs signal being utilized to meter the brewing water ,and to open and close the brewing water valve 36 at the brewer assembly 22. This solenoid operated valve is powered by current from the 24 volt DC power supply 354 preferably through a conventional relay, not shown, which is controlled by a signal from the master controller 340. Similarly, the high pressure pump 42 is powered from the power supply 372 through its own relay controlled from the controller 340 in response to signals from the flow meter 38. The water heater 41 for the vessel 34 is energized from a 240 volt AC power supply 354 controlled by the master controller in response to signals from a level sensor 346, and a temperature sensor 350 each being disposed in a respective parameter monitoring relation with the brewing water heater vessel 34.

In like manner the solenoid operated water supply valve 74 for the steam generator 70 is activated by current from the power supply 344 controlled by the master controller in response to signals from an upper level sensor 356, a lower level sensor 358, a pressure sensor 360, and a temperature sensor 362; and the water heater 72 is selectively energized from the power supply 354 controlled by the master controller in response to the same signals. A tea water valve 366 draws water from the hot water supply vessel 34 and is operated by power from the supply 344 controlled by the master controller 340 in response to operator input at the control panel 342.

The milk supply 110 is refrigerated by, in this example, the Peltier effect apparatus 117 which comprises three thermoelectric chips connected electrically in series and each requiring 16.8 volts DC of highly regulated and cleanly filtered current from the power supply 368. The power to the Peltier chips is controlled by the master controller in response to a "temperature" signal from a sensor 370 thermally coupled to the milk supply 110. The blower 120 which may be similarly controlled is powered from the 24 volt source 344. The milk quantity sensor 272 receives excitation AC current from a 120 volt AC power supply 372. The output signal indicating milk level is impressed upon the master controller 340 along the signal line 286. The position sensor 270 indicates when the milk supply drawer is securely and thermally snugly closed.

Referring particularly to the brewer assembly 22; it receives power from the power supply 354 and its associated components, the grinders 24, 30 are selectively powered from the 120 volt AC supply 372 in response to sequencing signals given to the master controller 340 from the operator control panel 342. When "decal" has been specified, the decaf chute 28 at the same time is electromechanically disposed by power from the supply 344 whereby the output from the decaf grinder 30, instead of regular grinder 24, is supplied to the brewing cylinder of the brewer assembly 22. Once the ground coffee charge from either the grinder 24 or 30 is placed in the brewing cylinder, it is packed to a predetermined reaction force which operates a packing switch 374 which impresses a corresponding signal to such effect upon the master controller 340. The brewer heater 40 maintains the mass of the brewer quiescently to a temperature of approximately that of the brewing water, or 185°, by power from the supply 354 in response to a temperature monitoring signal from the temperature sensor 376 which is impressed upon the master controller 340. A receptacle or waste drawer 56 receives the spent charge of coffee grounds, or cake, after each brewing cycle and a "please empty" signal is generated after a predetermined number of brewing cycles. However, a proximity switch 378 which indicates that the drawer is properly closed is monitored by the master controller and a "reset" signal is generated whenever the drawer has been removed for a period exceeding approximately six seconds, such a signal implying that the drawer 56 has been emptied. A position sensor 380 observes the instantaneous disposition of the actuating lever, or disc, of the brewing assembly, as it packs and removes the coffee grounds, and impresses corresponding signals upon the master controller. A pair of bean level sensors 382, 384 which may each be a set of photoelectric sensors, is disposed contiguously to each of the bean hoppers 26, 32 (FIG. 1) to generate a signal indicative of the bean supply level in each hopper.

With reference to the venturi 90 and vortex mixer 98 apparatus, it may be noted that the steam valve 82, the milk valve 96, and the air valve 92 are each powered by current from the power supply 344 in response to sequencing signals from the control panel 342.

The blowers 120, 122, 128, and 126 are shown connected electrically in parallel; however, in practice they, or subgroups of them, may be separately controlled as desired.

An indicator panel 390 comprises a set of illuminated readout devices which may receive their power as well as their actuation signals from the master controller 340. A reading of each monitored parameter discussed above may be selectively displayed on the panel by operation of the control panel 342 or automatically in predetermined circumstances as discussed infra.

Master Controller 340 and Operator Control Panel (Keyboard) 342

Figure 8:
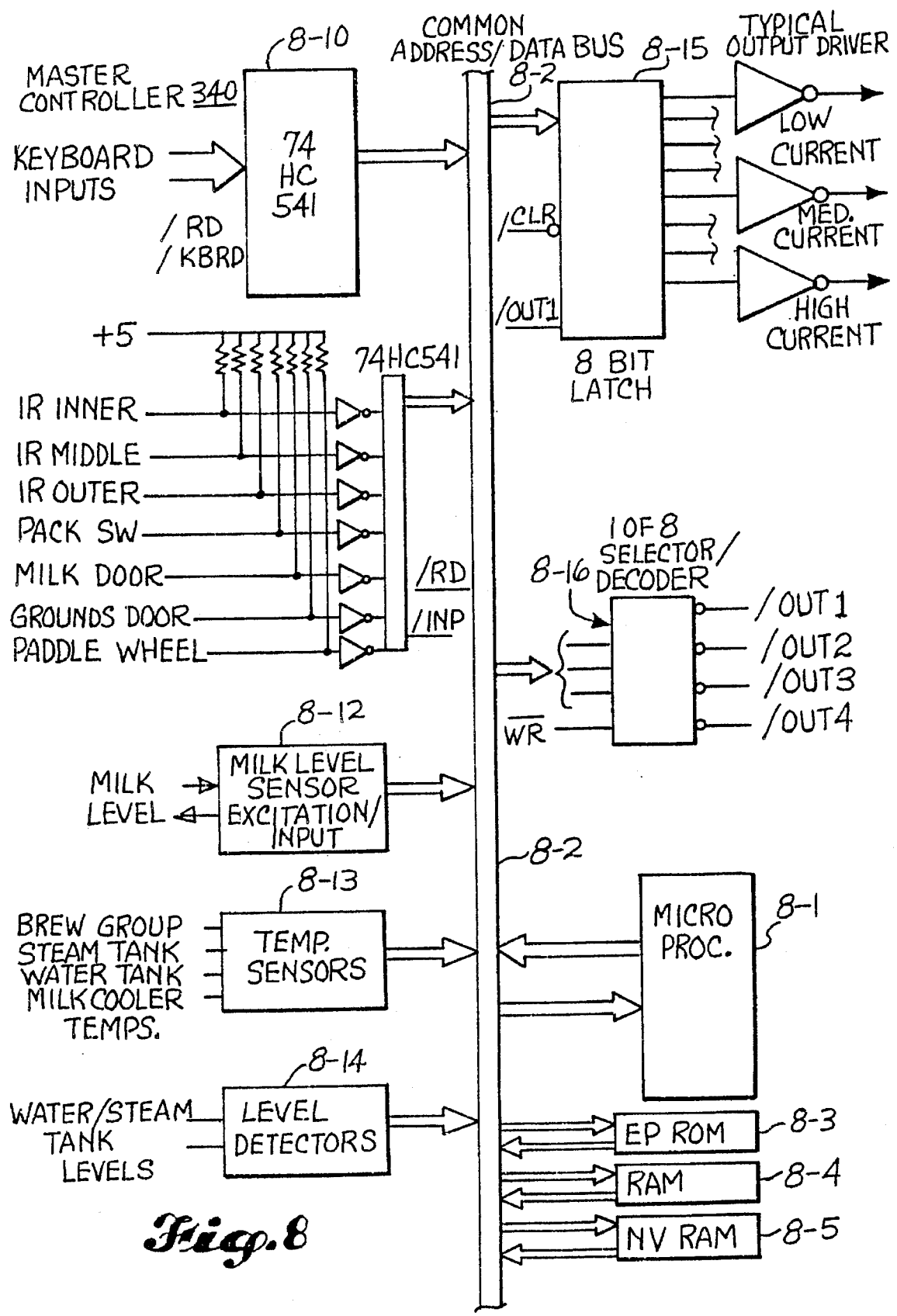
FIG. 8 is a block diagram of the master controller including micro-processor, EPROM and RAM, as well as input/out interface circuits.

The preferred embodiment of master controller 340 is illustrated in FIG. 8 and is shown to include a microprocessor 8-1 coupled to a common address/data bus 8-2 so as to communicate with read-only and random access memories shown as EPROM 8-2, RAM 8-3, and non-volatile RAM 8-4. Also, microprocessor 8-1 is coupled to the various input/output interface circuitry via bus 8-2, which in this embodiment includes the inputs of a keyboard input interface 8-10, sensor/detector input circuits indicated at 8-11, 8-13, and 8-14 as well as the various outputs for controlling power to relays and solenoids via an output latch 8-15 and a selector/decoder 8-16 for driving LED/LCD display elements on control panel 342 shown in FIG. 9.

In operation, microprocessor 8-1 executes instructions stored in EPROM 8-3. The programming provided by such stored instructions will be described in detail below beginning in connection with FIG. 10. RAM 8-4 serves as the random access memory for scratch pad processing in conjunction with microprocessor 8-1, and non-volatile RAM 8-5 is used as semi-permanent storage of various user and factory settings, such as the bean grinding times, milk injection times and various temperature and pressure settings.

Figure 9:
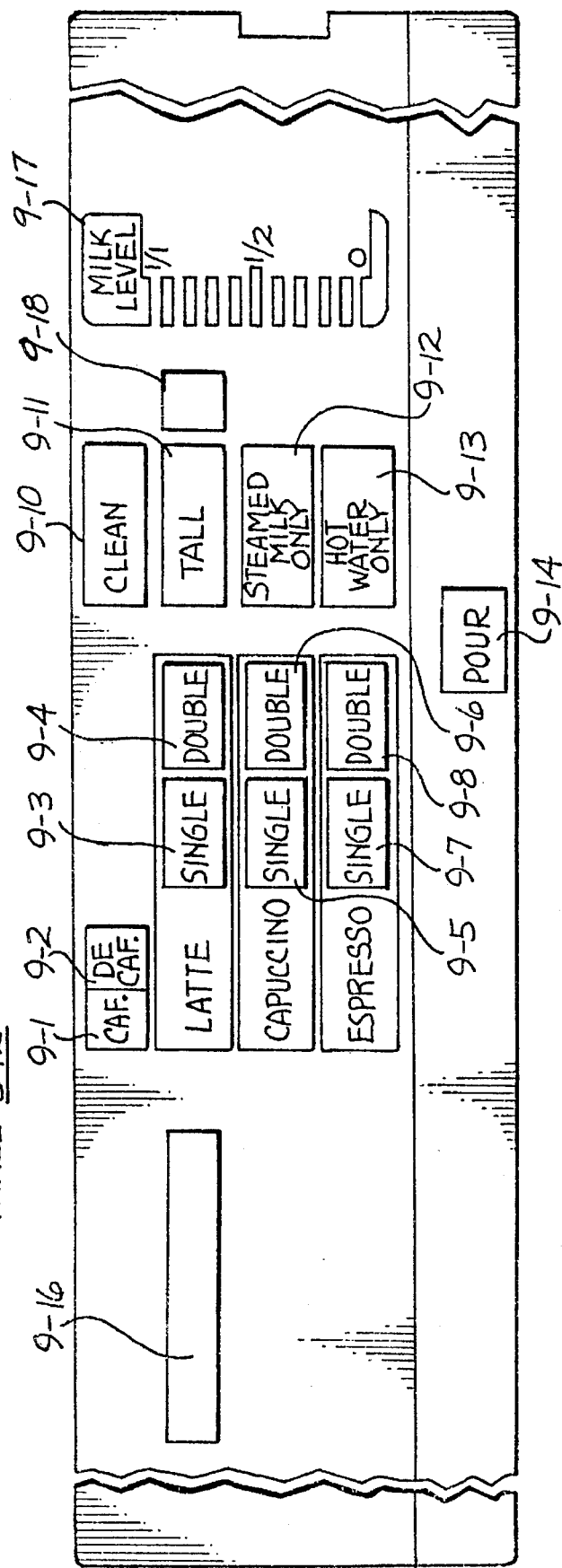
FIG. 9 is a layout of the control panel showing user accessible keys and LED display windows.

The operator's control panel (keyboard) 342 shown in FIG. 9 is of a conventional membrane type with key pads coupled through conventional buffer circuits (not specifically shown) to provide keyboard inputs to a octal tristate bus interface 8-10 which in turn communicates the key status to microprocessor 8-1 via bus 8-2. The input keys on control panel 342 include caf/decaf select keys 9-1, 9-2; single/double latte 9-3, 9-4; single/double cappuccino 9-5, 9-6; and single/double espresso 9-7, 9-8. To the right of the drink selection keys, a set of keys 9-10 through 9-13 select clean, tall (optional large serving), steamed milk only, and hot water only, respectively. Centered beneath the drink and function select keys is a pour select key 9-14 that causes the master controller to carry out (execute) the drink selection instructions registered by the above listed keys.

Indicators (LED/LCD) are provided on panel 342. Of these, an alpha-numeric display window 9-16 provides prompts, confirmation of drink selections, and other messages displayed back to the operator in accordance with the programmed microprocessor. A milk level indicator 9-17 responds to the milk weight transducer unit described above in connection with FIG. 5 to continuously display the remaining amount of refrigerated milk. Displays 9-16 and 9-17 are in this embodiment conventional LCD and LED devices; respectively.

A "hidden" user key 9-18 is also available in a unmarked area of the membrane control panel, not readily discernible and serves to initiate a series of hidden menus operations that are selectable in conjunction with display 9-16 for performing various machine settings, statistical accounting and other functions described below in connection with the hidden menu programming commencing with FIG. 24. Hidden key 9-18 is not intended to be used by the casual operator, and the hidden aspect of it provides a level of security to prevent unauthorized or unintended changes to the machine settings.

Returning to FIG. 8, the sensor inputs shown at 8-11 enable the microprocessor 8-1 to receive various inputs from the brewing group sequencer that has a set of inner, middle and outer infra red (IR) sensors that are correlated to the position cycle of an electromechanical disc sequencer, being a standard part of the above mentioned conventional brewer assembly used in this embodiment. Pack switch input likewise is an input signal available from the brewer assembly indicating the packing state of the grounds pack. Milk door, grounds door, and paddle wheel (measures brew water volume) inputs provide status of these respective components as discussed previously.

The milk level sensor excitation/input 8-12 operates with a per se conventional linear variable differential transformer having AC excitation and transducer output representing the weight of the milk as described above in connection with FIG. 5. The weight value is an analog signal, converted by input 8-12 to digital and correlated to the volume of milk that is registered by indicator 9-17 on control panel 342. The microprocessor 8-1 monitors the output transducer signal representing milk weight and hence volume.

Temperature sensors 8-13 are conventional thermistors that are interfaced with bus 8-2 by conventional amplifier, filtering, and analog-to-digital conversion circuitry in order to produce the multi-bit digital equivalents of the analog thermistor values. Specifically, the following temperature inputs are provided: brew group temperature, steam tank temperature, water tank temperature, and milk cooler temperature.

Level detectors 8-14 are provided in this embodiment by conventional fluid level detector circuits using level detector rods (not specifically shown) that sense ionic fluids (namely water) to cause a marked change in impedance level. The detection is sensed by a conventional tristate bus driver under the control of the microprocessor 8-1 as known per se. The level detectors 8-14 provide the following inputs: water tank minimum level, steam tank minimum was level, steam tank maximum water level.

Output latch 8-15 one of three in this example, produces the needed output control signals for driving various relay, solenoid, and other electromechanical output devices. The latch 8-15 is coupled to output drivers of different current capacity, namely low, medium and high current drives, depending upon the requirement of the driven device. More specifically, the medium current drive outputs control in this embodiment the following devices: milk cooler heat sink fan, milk cooler power control, brew group motor power, brew group-motor direction, grinder motors, brew group heater element control, water tank heater element control, steam tank heater element control, brew water pump control, and brew water valve control. The high current drivers operate the following: hot water valve, steam 1 valve, steam 2 valve (cappuccino steam valve), air valve for control of aeration of steamed milk, decaf select solenoid, brew group motor brake release solenoid, milk valve, and steam tank water valve. The low current drive outputs are used to control a beep annunciator when provided for announcing, as an example, alarms or key press confirmation.

Selector/decoder 8-16 drives the LED and LCD displays provided on control panel 342, again in a conventional manner using commercially available IC devices.

Master Controller Program

The program employed by master controller 340 and in particular the microprocessor 8-1 thereof consists of a main program (see FIGS. 10–22), several interrupt routines (FIG. 23), and hidden menu routines (FIGS. 24–30). The main program is implemented as a series of program modules including primitives that handle the scanning of the keyboard inputs from control panel 342 and outputs to the display elements on the same panel. In this preferred embodiment, the software programming of microprocessor 8-1 is prepared in C language, compiled, assembled and then loaded into EPROM 8-3 to form part of master controller 340 shown in FIG. 8.

The primitives include such items as key press checking, keyboard values, outputs 8-16 to LCD display, analog-to-digital conversion, outputs to selected output drivers associated with latch 8-15, and sensing of input signals at selected input sensors 8-11, 8-12, 8-13, and 8-14.

The programming modules include the main operating routines as shown in FIGS. 10–30 and a variety of special task routines including housekeeping (maintain temperatures, water levels, heater turn-off response to low steam or water level); interrupt routines for checking keyboard and processing key presses, routines for decrementing counters for timing, including timing of increments associated with housekeeping tasks; parameter setting and review using a hidden menu (to set grind times, milk injection times, etc., and optional service and statistical routines for testing, servicing, and reviewing of cumulative statistics such as output quantities of various drinks.

Figure 10A:
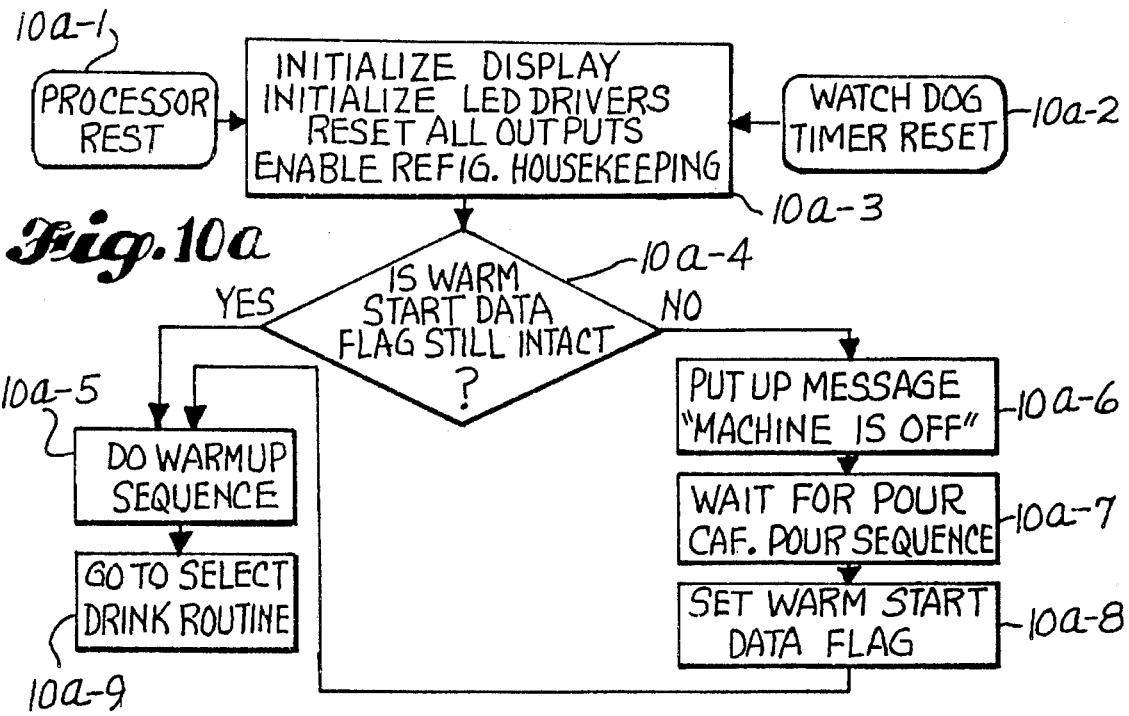
FIGS. 10a and 10b are flow diagrams of the preferred programming of the micro-processor for initialization and warm up, respectively.
Figure 10B:
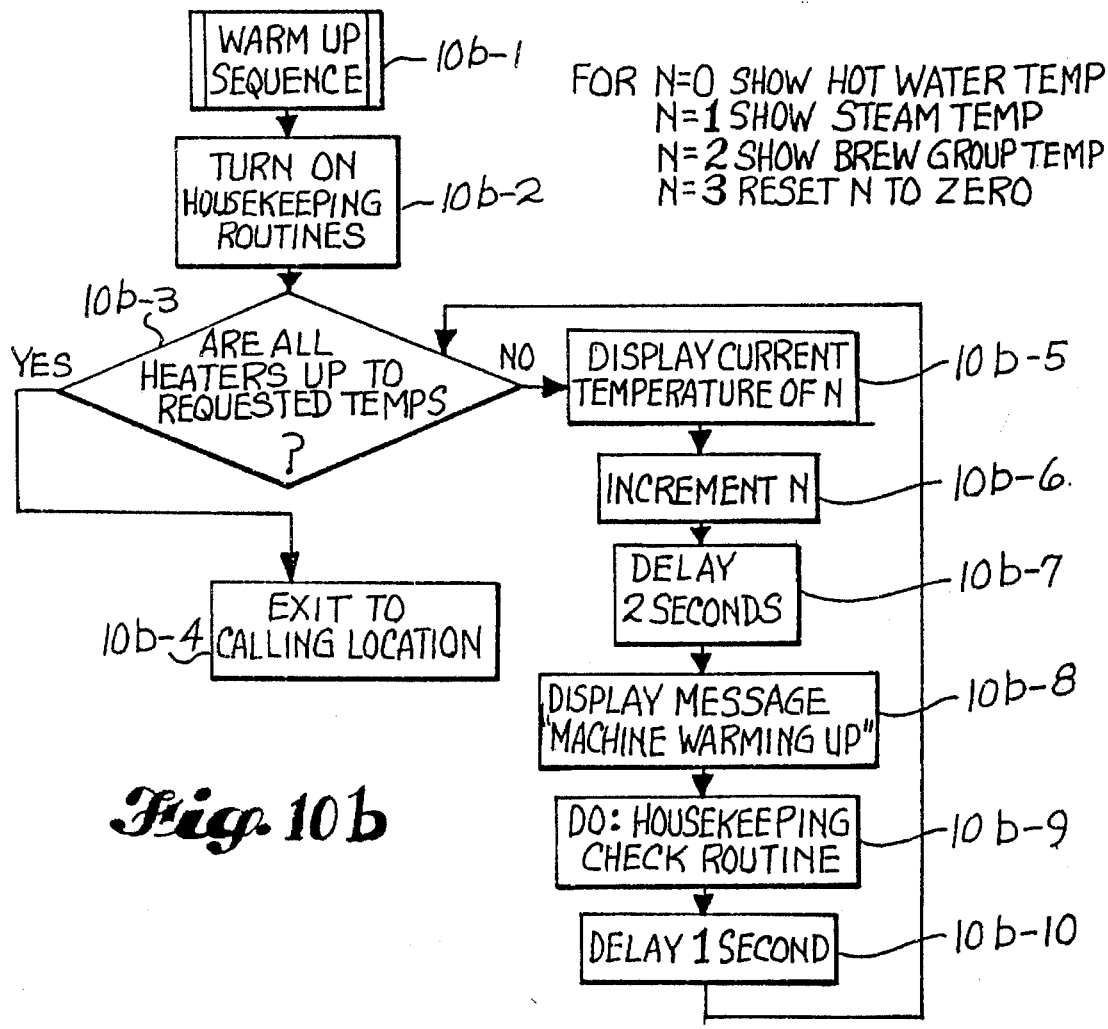

Now with reference to the programing of master controller 340 as shown in the flow charts beginning FIGS. 10a and 10b, these two routines initialize the components of master controller 340 and provide for a warm up period.

More specifically, FIG. 10a is a flow diagram of the start-up routine for the initialization sequence. After block 10a-1, processor reset, and/or block 10a-2, watchdog timer reset, block 10a-3 initializes the display and the LED drivers, resets all outputs and enables the refrigeration housekeeping sequence.

Next, decision block 10a-4 inquires whether the warm start data flag is still intact. If the answer to this inquiry is yes, the warm-up sequence is performed at block 10a-5. If the answer to this inquiry is no, the "MACHINE IS OFF" message is activated at block 10a-6, and, at block 10a-7, the system waits for "pour, caf, pour" sequence. Block 10a-8 then sets the warm start data flag. Block 10a-8 leads to the above described warm-up sequence block, 10a-5. Block 10a-9 instructs to go to the select drink routine.

FIG. 10b-3 is a flow diagram of the start-up routine for the warm-up sequence. Specifically, blocks 10b-1 through 10b-10 detail this routine.

Block 10b-3 is a decision block which inquires whether all of the heaters (water, steam and brew group heaters) have attained the required temperatures. If not, the sequence of blocks 10b-5 through 10b-10 are performed until the required temperatures are attained. Then, the program exits to calling location via block 10b-4. Note that, in blocks 10b-5 and 10b-6, N may have a value of from 0 to 3. N=0 shows hot water temperature, N=1 shows steam temperature. N=2 shows brew group temperature. N=3 resets the N value to 0.

Figure 11A:
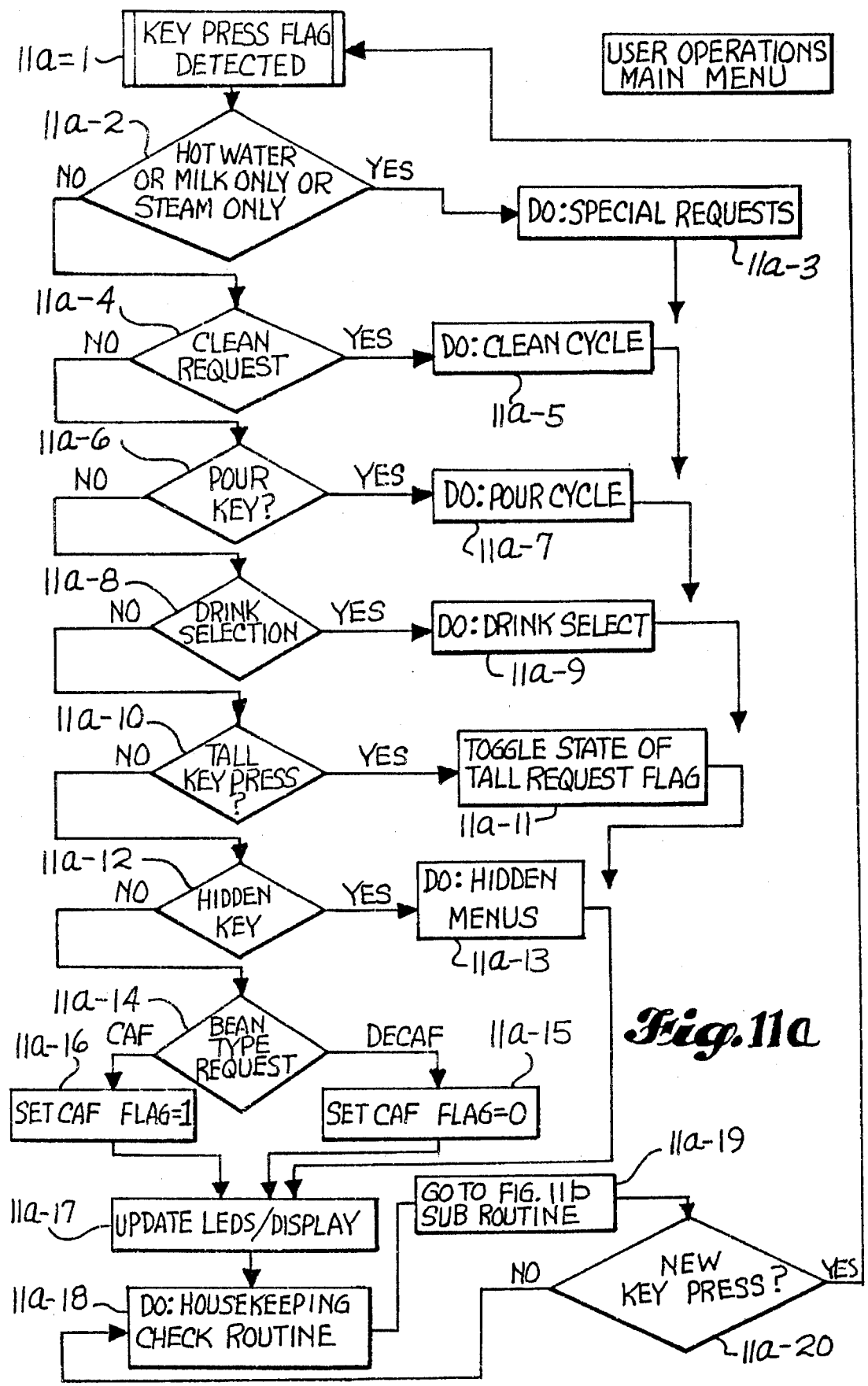
FIG. 11a is a further programming flow diagram of the user operation routine.

FIG. 11a is a further programming flow diagram of the user operation routine. Blocks 11a-1 through blocks 11a-20 detail this routine. Specifically, blocks 11a-2 and 11a-3 detail hot water, milk-only or steam-only user operations. Blocks 11a-4 and 11a-5 show the clean request user operation. Blocks 11a-6 and 11a-7 provide the pour user operation. Blocks 11a-8 and 11a-9 perform the drink selection user operation. Blocks 11a-10 and 11a-11 detail the tall drink user operation. Blocks 11a-12 and 11a-13 show the hidden menu user operation. Blocks 11a-14 through 11a-16 provide bean type user operation (caffeinated or decaffeinated).

Figure 11B:
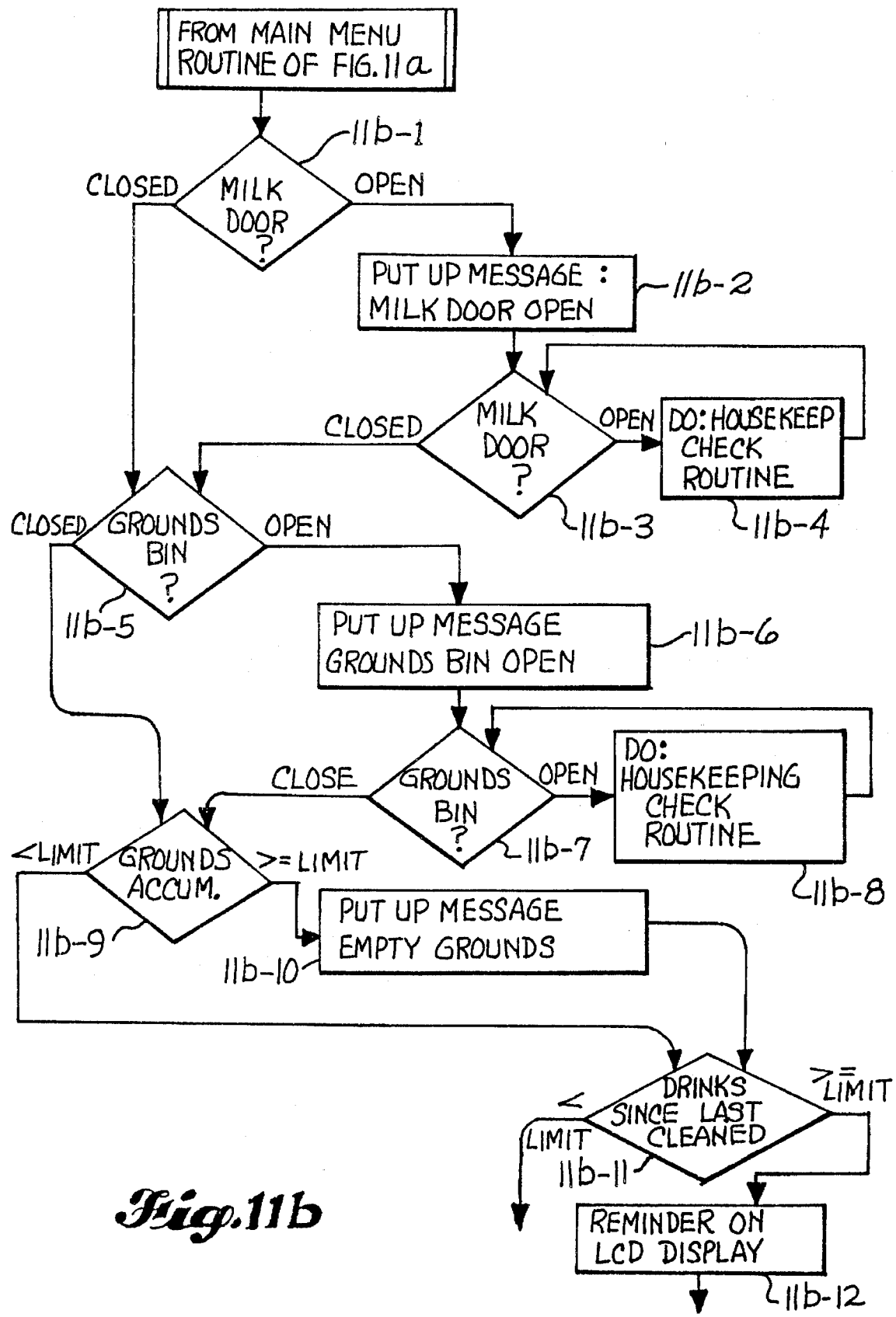
FIG. 11b is a subroutine milk door, grounds bin and ground accumulation status.

Note block 11a-19, which is a "go to" block instructing the implementation of the subroutine of FIG. 11b.

FIG. 11b is a flow diagram of a subroutine of the main flow diagram shown in FIG. 11a. The subroutine of FIG. 11b is for milk receptacle door, coffee grounds bin, and coffee grounds accumulation status and consists of blocks 11b-1 through 11b-12.

Blocks 11b-1 through 11b-4 provide the status of the milk rectangle door (open or closed). Blocks 11b-5 through 11b-8 provide the status of the coffee grounds bin (open or closed). Blocks 11b-9 and 11-10 provide the status of the coffee grounds accumulation.

Figure 12:
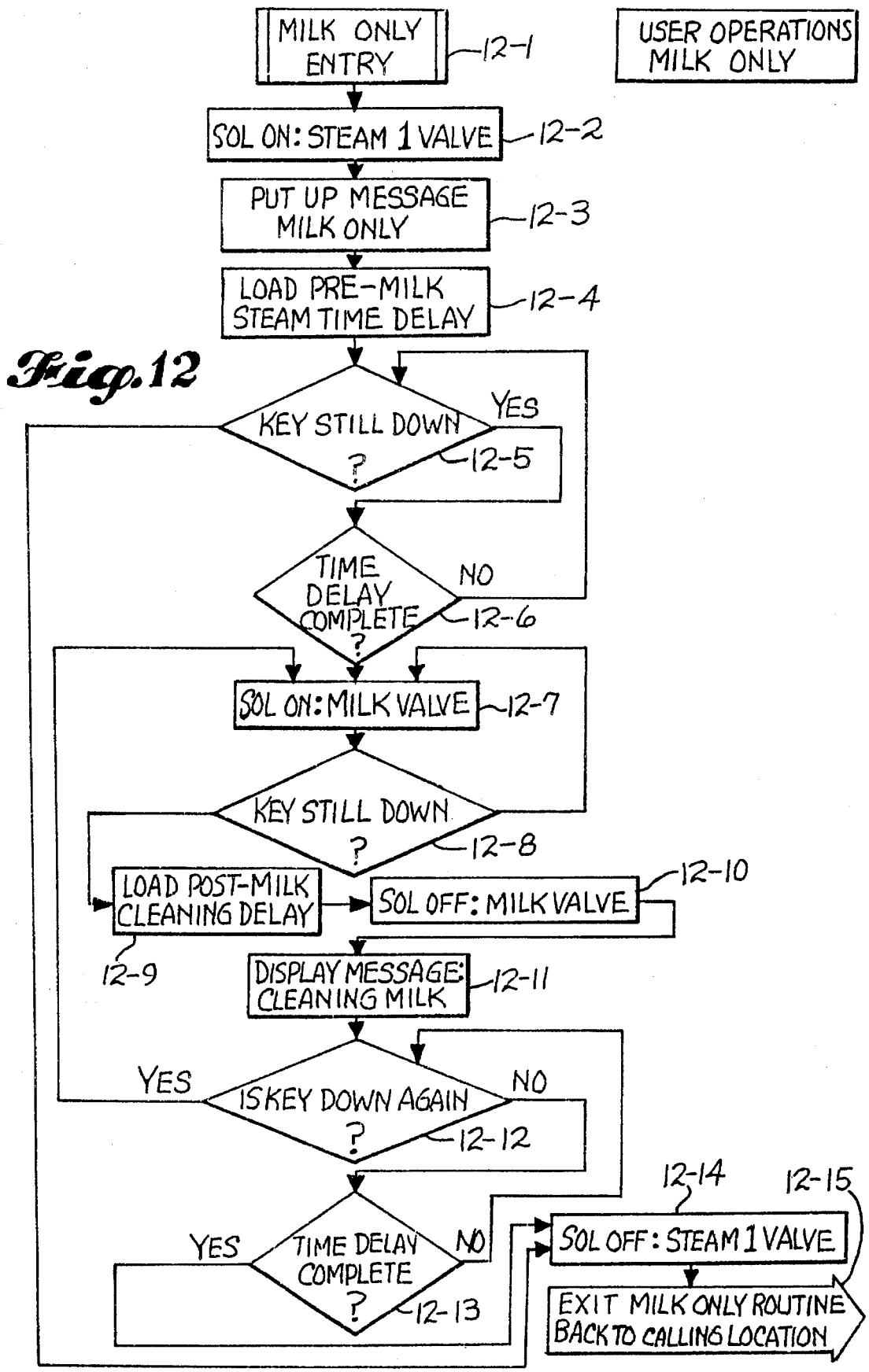
FIG. 12 is a flow diagram of the milk-only programming cycle that causes the machine to deliver steamed milk only.

FIG. 12 is a flow diagram of the milk-only programming cycle that causes the machine to deliver steamed milk only. FIG. 12 is comprised of blocks 12-1 through 12-15.

As shown in FIG. 12, block 12-1 activates the solenoid controlling steam 1 valve (steam valve 81). Block 12-3 provides the user message "MILK ONLY". Block 12-7 activates the milk valve solenoid. Block 12-10 deactivates the milk valve solenoid. Block 12–14 deactivates the steam valve 1 solenoid.

Figure 13A:
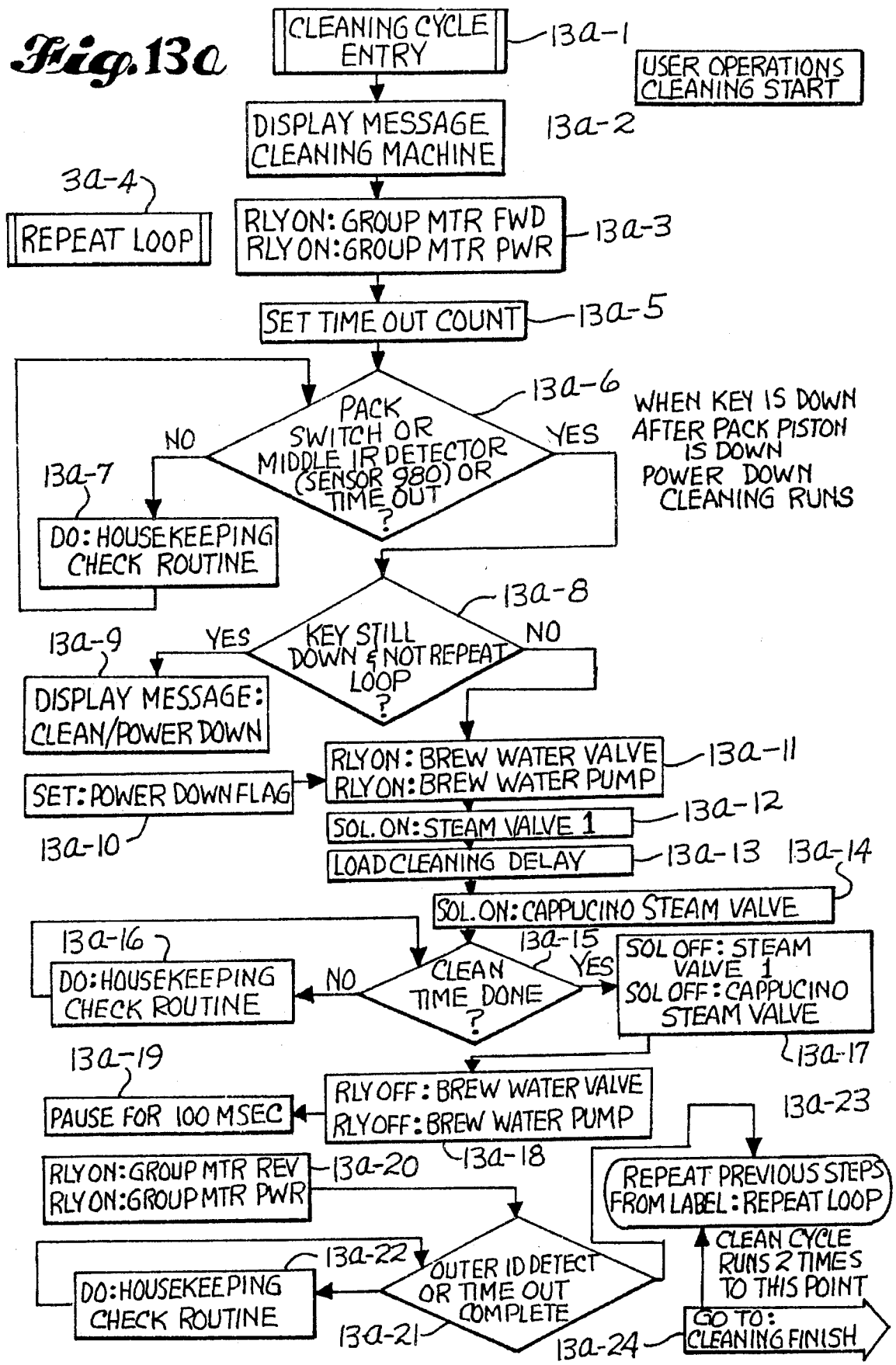
FIG. 13a and 13b are flow diagrams of the clean/select cycle.

FIG. 13a is a flow diagram of the clean/select start cycle. FIG. 13a is comprised of blocks 13a-1 through 13a-24. Specifically, block 13a-2 displays the "CLEANING MACHINE" message. Block 13a-3 turns on the group motor power and group motor-forward relays. As shown in block 13a-6, the process continues until one of the following occurs.: a middle infra red detection (position sensors 380), open pack switch or predesignated run time. The above relays are then deactivated at block 13a-10, (set: power down flag).

Blocks 13a-11, 13a-12 and 13a-14 activate the relays for the brew water valve and brew water pump, and the solenoids for the steam 1 valve (steam valve 81) and cappuccino steam valve (steam valve 82). After a predesignated time, see block 13a-15, the solenoids for the steam 1 valve (steam valve 81) and the cappuccino steam valve (steam valve 82) are deactivated at block 13a-17, and the relays for the brew water valve and the brew water pump are deactivated at block 13a-18.

At block 13a-20, the relay for the group motor power and the relay for the group motor-reverse are activated. This process continues until, at block 13a-21, either an outer infra red detection (position sensors 380) occurs or a predetermined time elapses. Block 13a-23 is a repeat loop. Next, the cleaning cycle proceeds to "cleaning finish", as described below and in FIG. 13b.

Figure 13B:
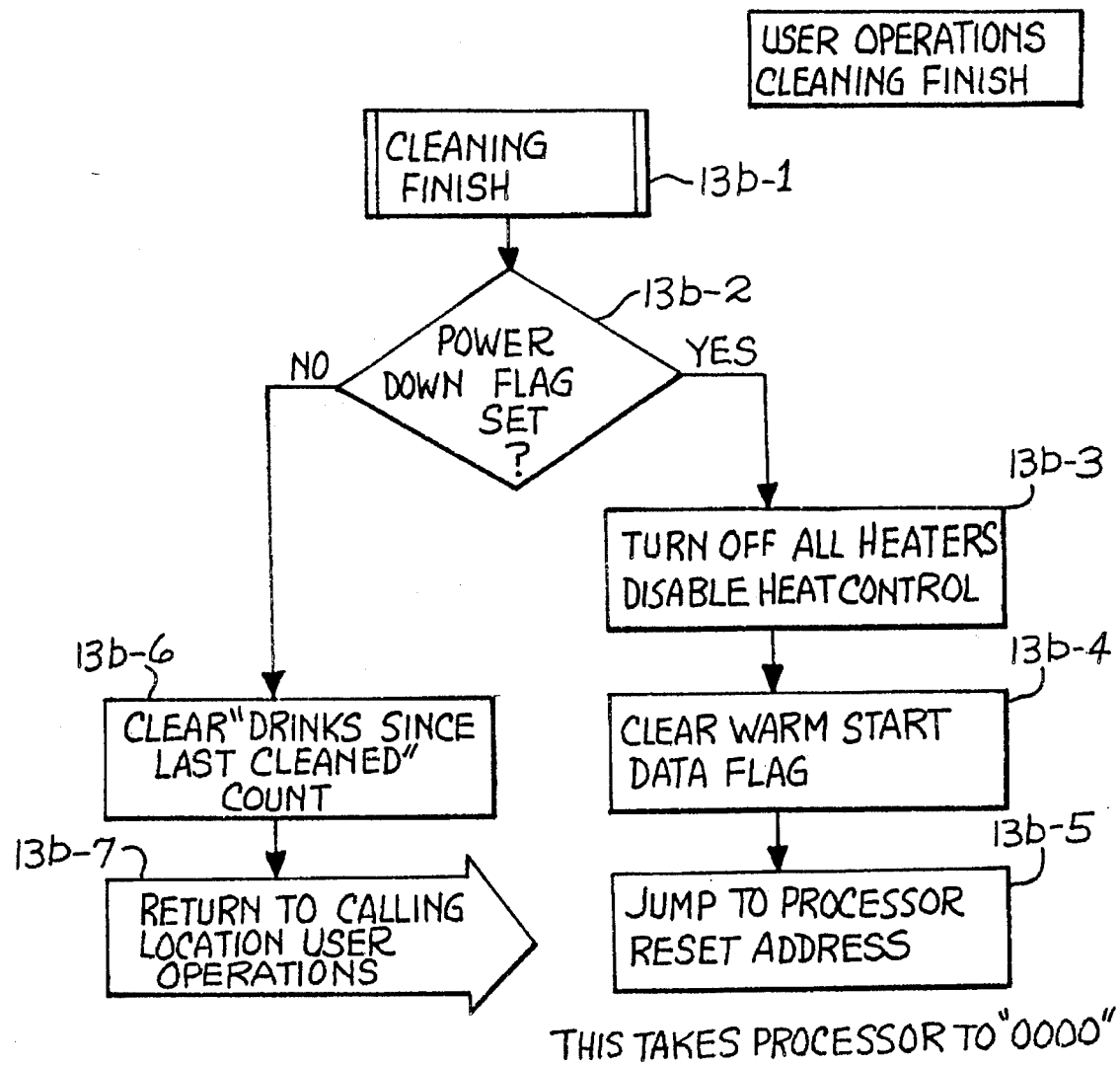

FIG. 13b is a flow diagram of the clean/select finish cycle, and is comprised of blocks 13b-1 through 13b-7. If, at block 13b-2, the power down flag has been set, all heaters are deactivated and heat controls are disabled at block 13b-3. The warm start data flag is cleared at block 13b-4 and the processor address is reset to "0000" at block 13b-5.

Figure 14:
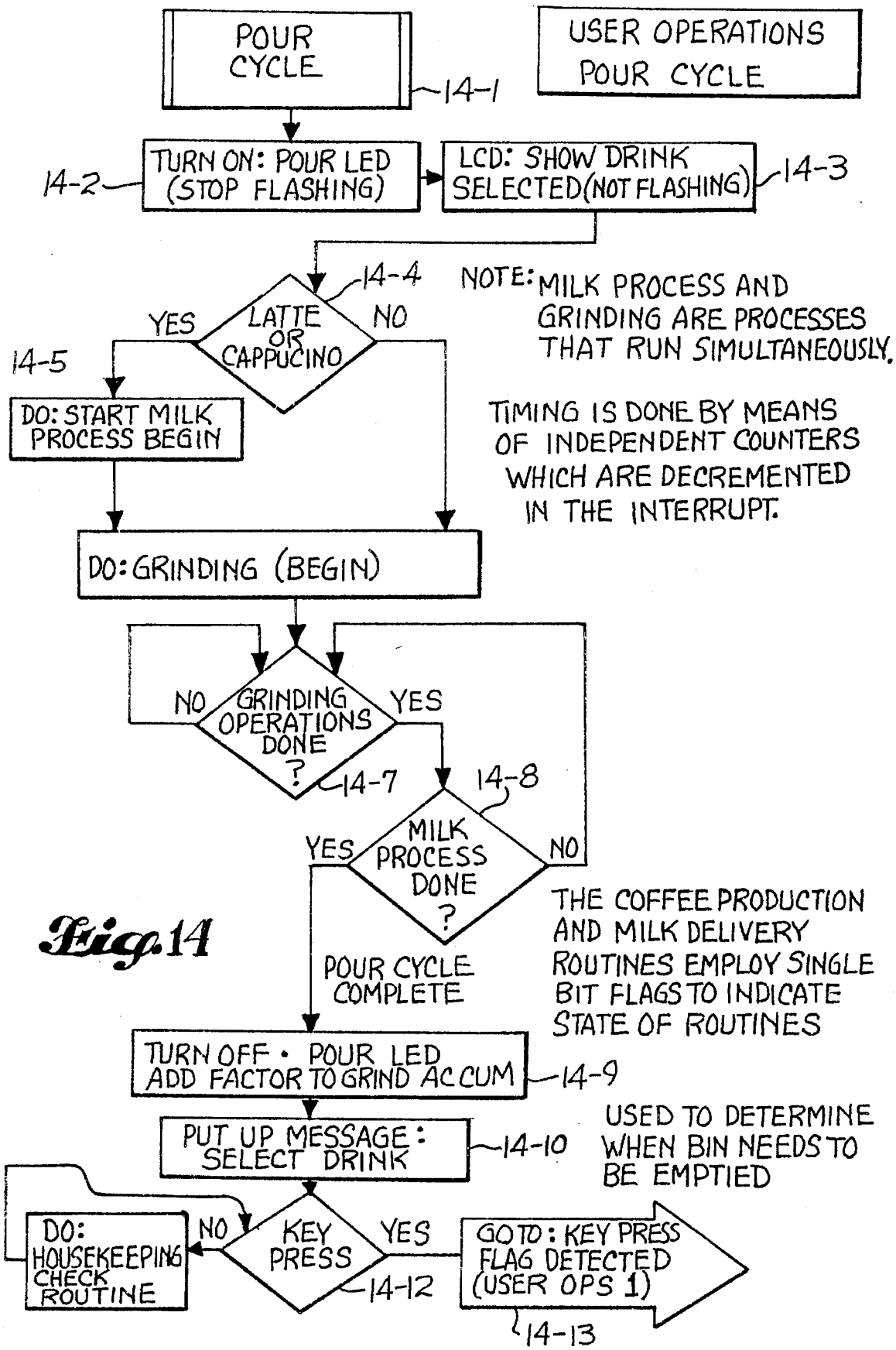
FIG. 14 is a flow diagram of the pour cycle.

FIG. 14 is a flow diagram of the pour cycle and consists of blocks 14-1 through 14-13. Block 14-2 stops flashing of the "POUR" LED. Block 14-3 shows the drink selected. If latte or cappuccino is selected at block 14-4, the milk process is initiated at block 14-5 and continues at block 14-8. Grinding begins at block 14-6 and continues at block 14-7.

The pour cycle is now complete. Block 14-9 deactivates the "POUR" LED. Block. 14-10 activates the "SELECT DRINK" message.

Figure 15:
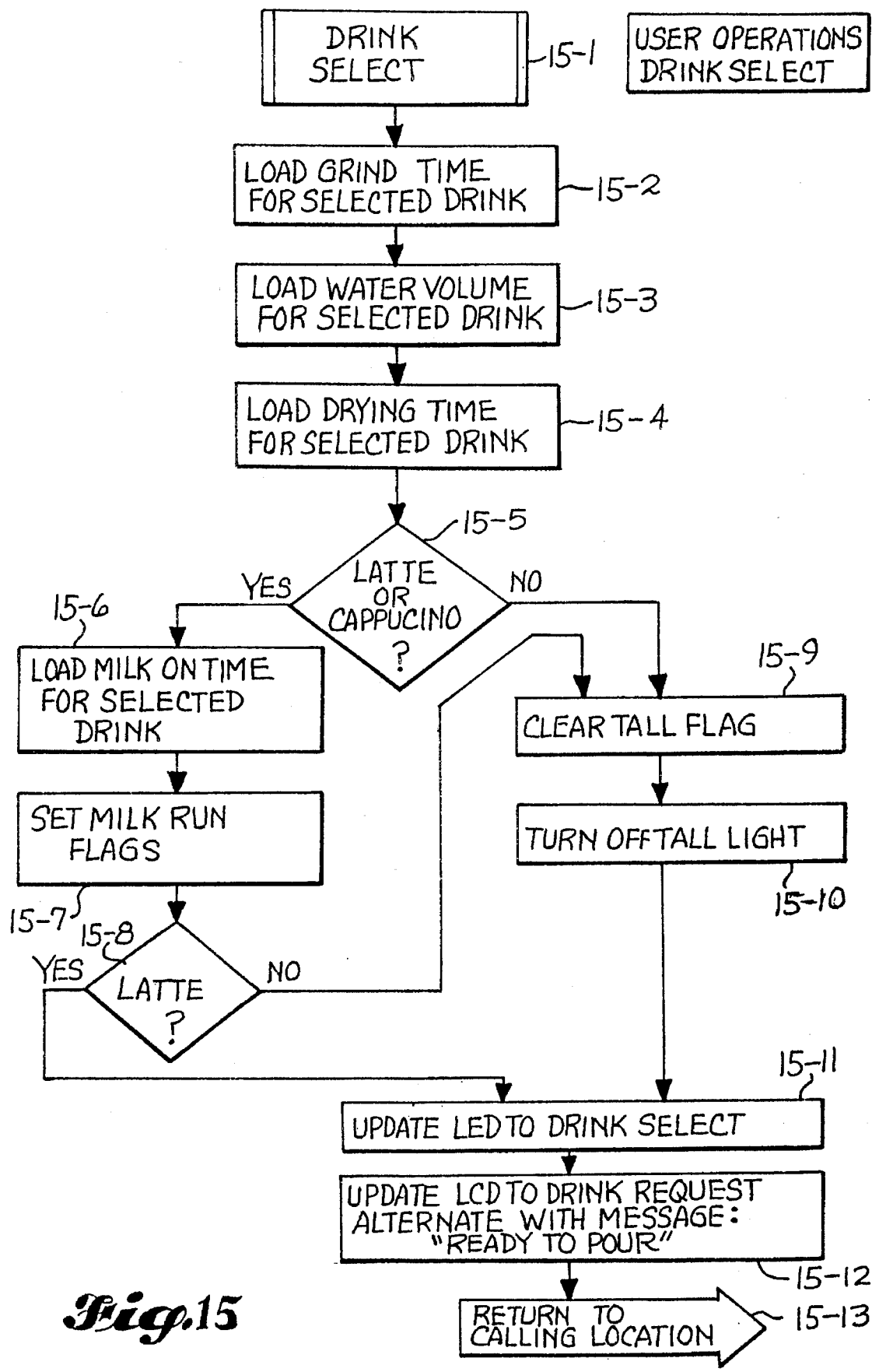
FIG. 15 is a flow diagram of the drink/select cycle.

FIG. 15 is a flow diagram of the drink/select cycle and consists of blocks 15-1 through 15-13. Blocks 15-2, 15-3 and 15-4 load the grind time, water volume and drying time, respectively, for the selected drink. If latte or cappuccino is selected at block 15-5, the milk on time for the selected drink is loaded at block 15-6 and the milk run flags are set at block 15-7.

If latte was not selected at block 15-8, or if neither latte nor cappuccino were selected at block 15-5, i.e., if the selected drink is either espresso or cappuccino, the tall flag is cleared at block 15-9 and the tall light is deactivated at block 15-10.

Block 15-11 updates the LED for the drink selected and block 15-12 updates the LCD for the drink requested.

Figure 16:
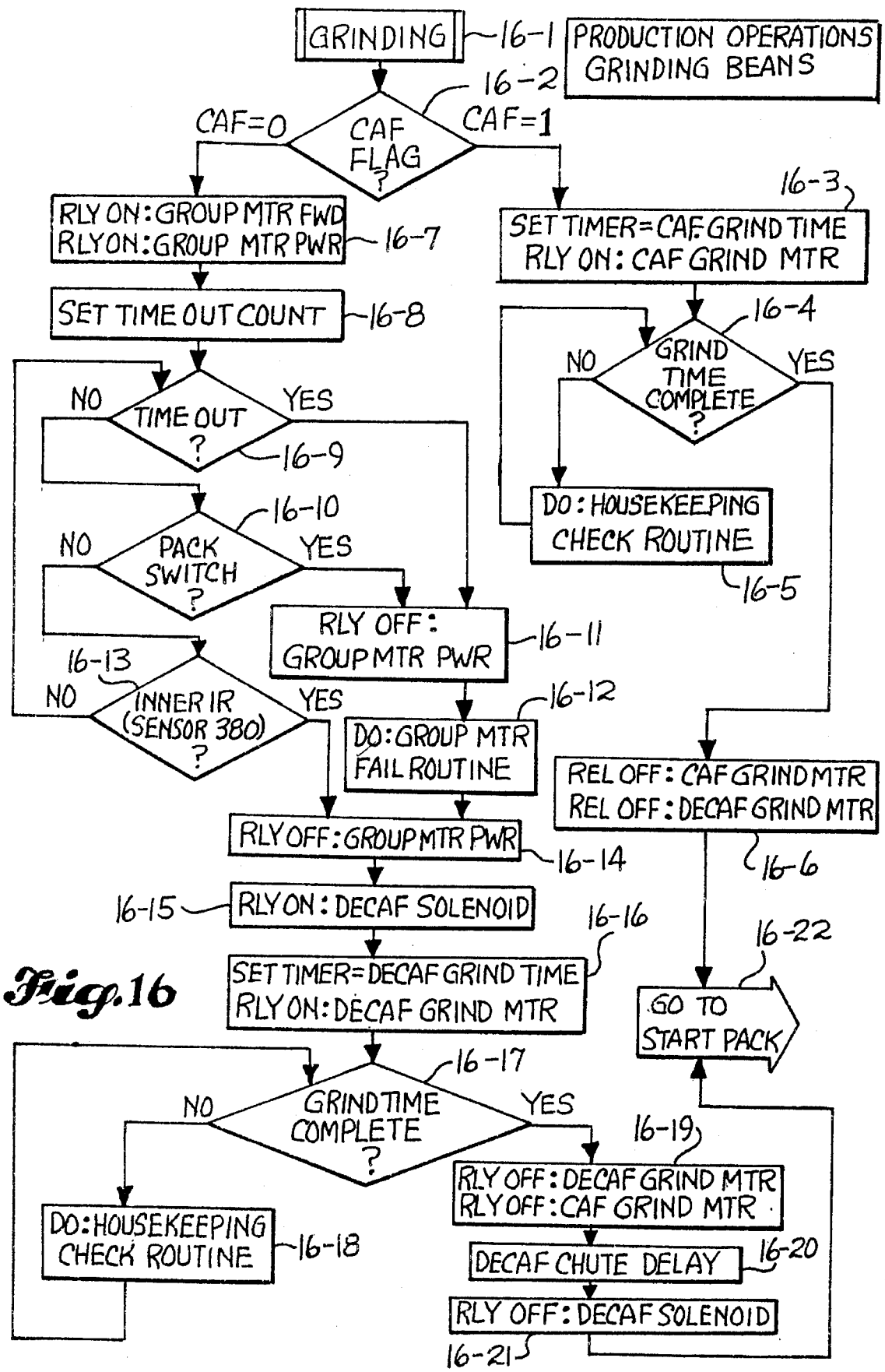
FIG. 16 is a flow diagram of the operations for grinding beans.

FIG. 16 is a flow diagram of the operations for grinding beans and includes blocks 16-1 through 16-22. If the CAF flag at block 16-2 equals 1, the program proceeds to block 16-3 where the timer is set to the CAF grind time and the relay of the CAF grind motor is activated. The above process is continued until the predetermined grind time has elapsed, as shown at block 16-4. Block 16-5 then deactivates the CAF and DECAF grind motors.

If, however, at block 16-2 the CAF flag equals 0, the program proceeds to block 16-7 where the relays for the group motor-forward and group motor power are activated. Blocks 16-9, 16-10 and 16-13 determine whether a predetermined time has passed, the pack switch is open or an inner infra red detection (position sensors 380) has occurred, respectively.

Block 16-14 then deactivates the group motor power relay and block 16-15 activates the DECAF solenoid. At block 16-16 the timer is set to DECAF grind time and the relay of the DECAF grind motor is activated. The above process continues until the predetermined grind time has elapsed, as shown at block 16-17. Block 16-19 then deactivates both the CAF and DECAF grind motors. Next, at blocks 16-20 and 16-21, respectively, the DECAF chute delay is activated and the DECAF solenoid relay is deactivated.

Figure 17:
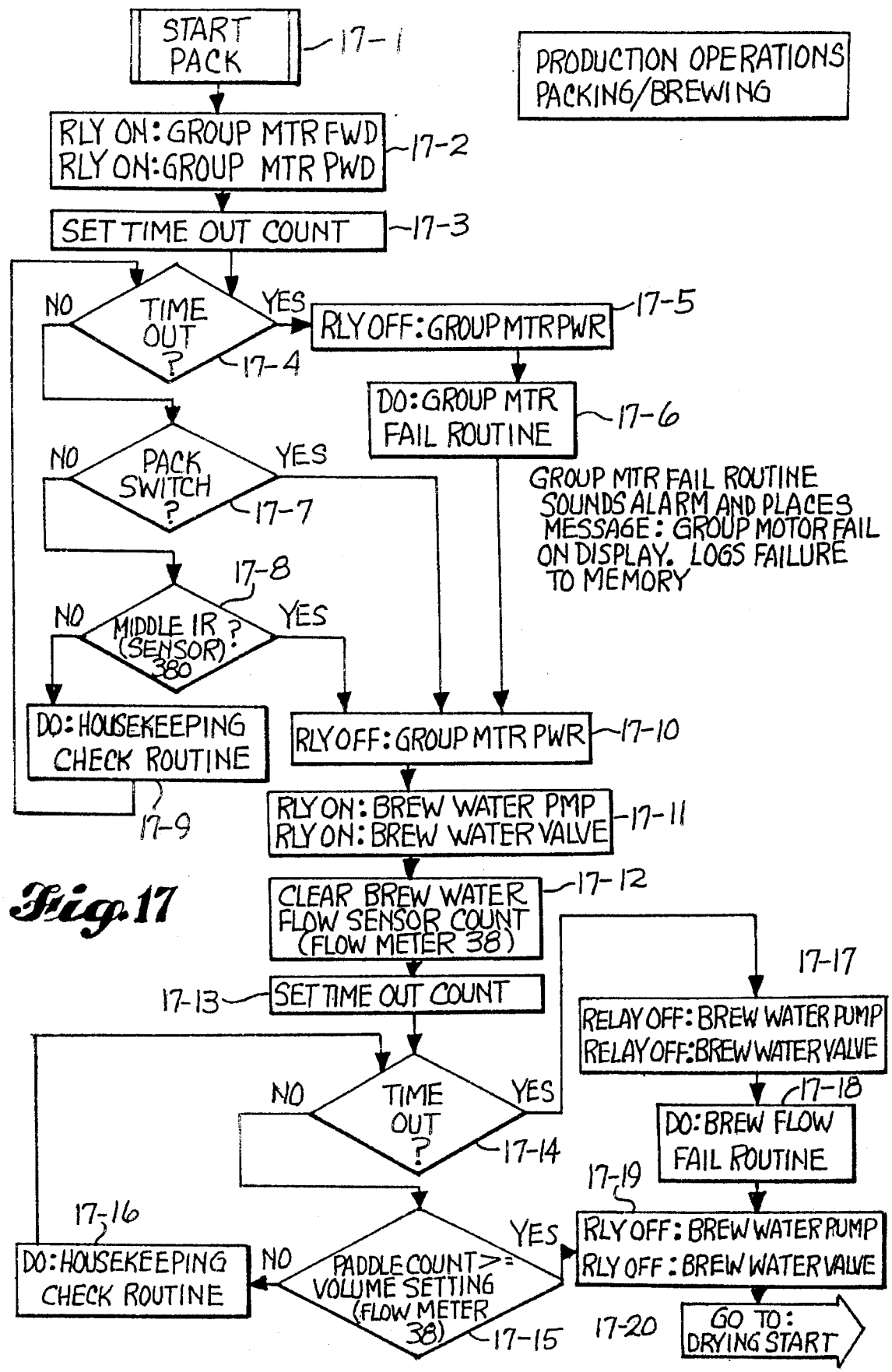
FIG. 17 is a flow diagram of the packing/brewing operations.

FIG. 17 is a flow diagram of the packing/brewing operations including blocks 17-1 through 17-20. Block 17-2 activates the relay for the group motor-forward and the relay for the group motor power. A set time out count is provided at block 17-13. If the predetermined time period elapses (block 17-14), the pack switch opens (block 17-7) or a middle infra red detection (position sensors 380) occurs (block 17-8), the group motor power relay is deactivated at block 17-5 or block 17-10.

At block 17-11 the relays for the brew water pump and brew water valve are activated. After a predetermined time (blocks 17-13 and 17-14), the brew water pump and brew water valve relays are deactivated (at block 17-17 or block 17-19).

Figure 18:
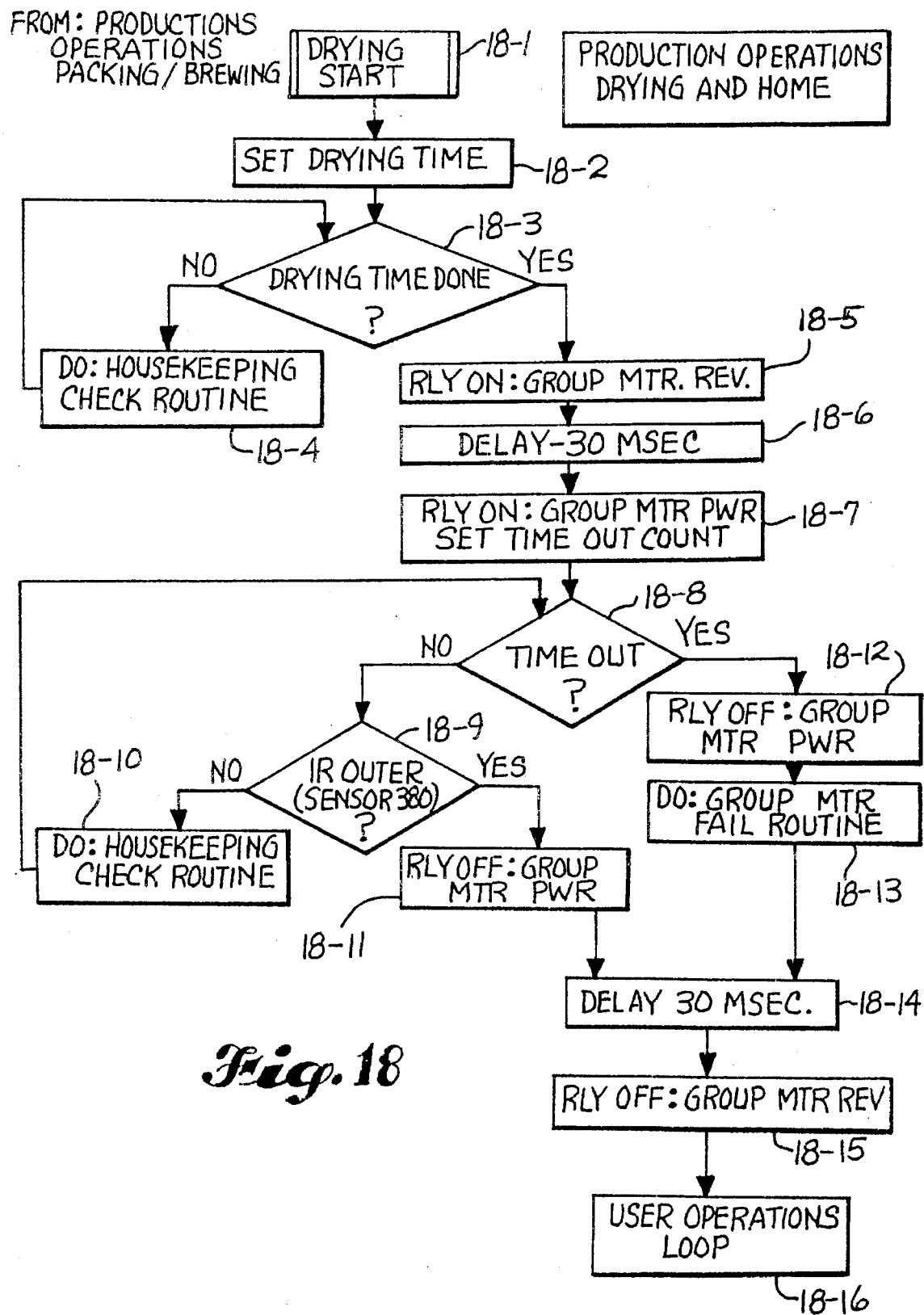
FIG. 18 is a flow diagram of the drying (by which the grounds cake is squeezed at the end of the brewing cycle to remove residual liqueur) and return the brewing apparatus to an initial (home) condition.

FIG. 18 is a flow diagram of the drying cycle (by which the ground cake is squeezed at the end of the brewing cycle to remove residual liquor) and return of the brewing apparatus to an initial (home) condition. FIG. 18 includes blocks 18-1 through 18-16.

Block 18-2 sets the drying time. Block 18-3 ascertains whether this drying time has elapsed. Blocks 18-5 and 18-7 activate the relays for the group motor reverse and group motor power, respectively. Block 18-7 also sets a time out count, after which the relay for the group motor power is deactivated at block 18-12.

At block 18-9, outer infra red detection (position sensors 380) is checked. The group motor power relay is deactivated at block 18-11 if an outer infra red detection occurred at block 18-9. The group motor-reverse relay is deactivated at block 18-15.

Figure 19:
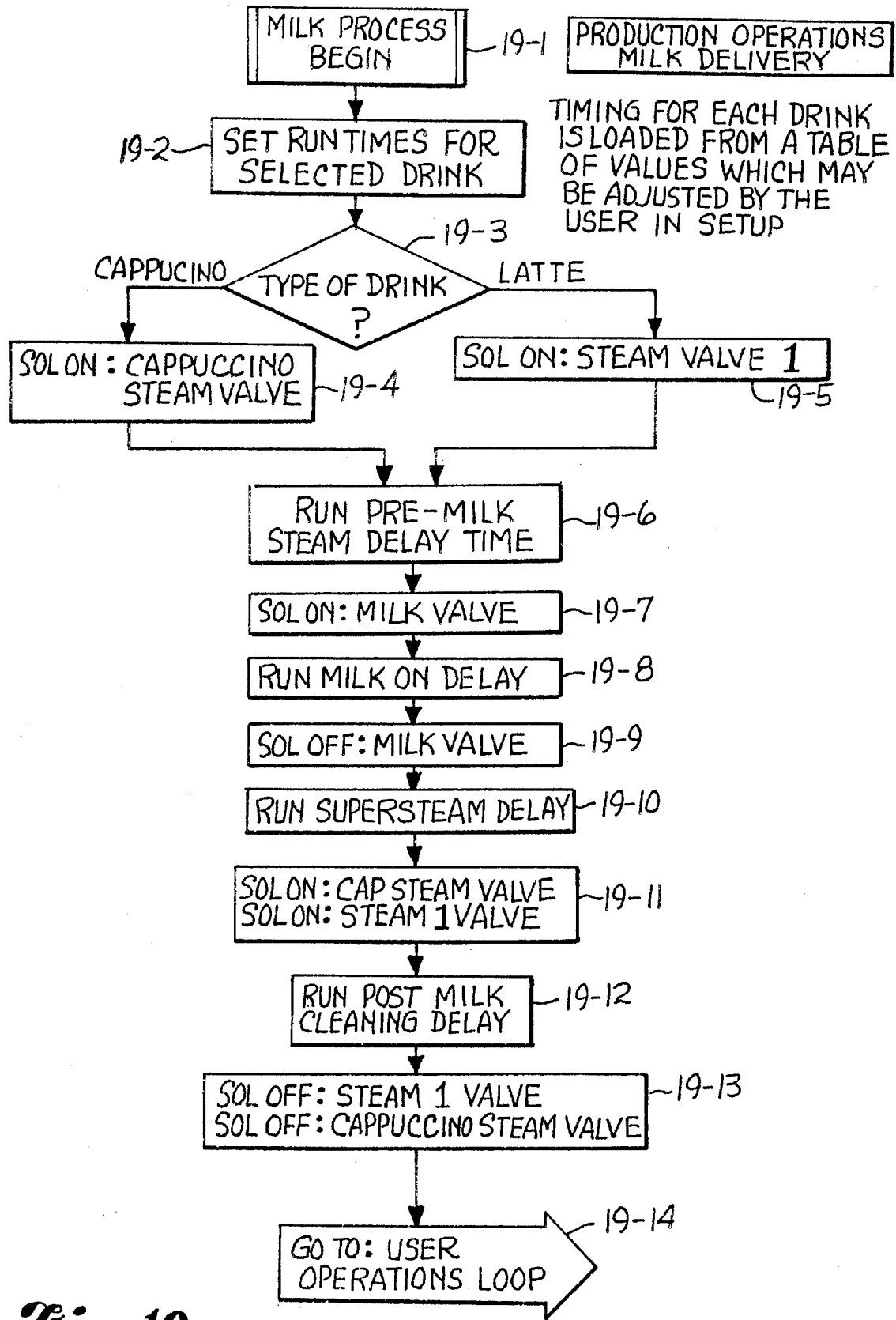
FIG. 19 is a flow diagram of the milk delivery cycle for latte and cappuccino.

FIG. 19 is a flow diagram of the milk delivery cycle for latte and cappuccino. FIG. 19 consists of blocks 19-1 through 19-14. The run times for the selected drink are set at block 19-2 based on a table of values which may be adjusted by the user in the set-up procedures.

At block 19-3, the type of drink, latte or cappuccino, is selected. If latte is selected, the solenoid for steam 1 valve (steam valve 81) is activated. If cappuccino is selected, the solenoid for cappuccino steam valve (steam valve 82) is activated.

Both blocks 19-4 and 19-5 lead to block 19-6, which runs the pre-milk steam delay time. Blocks 19-7 activates the milk valve solenoid. Block 19-8 runs milk on delay. Block 19-9 deactivates the milk valve solenoid. Block 19-10 runs supersteam delay.

In block 19-11, the solenoids for the steam 1 valve (steam valve 81) and the cappuccino steam valve (steam valve 82) are activated. The post-milk cleaning delay is run at block 19-12. The solenoids for the steam 1 valve (steam valve 81) and cappuccino steam valve (steam valve 82) are deactivated at block 19-13.

Figure 20:
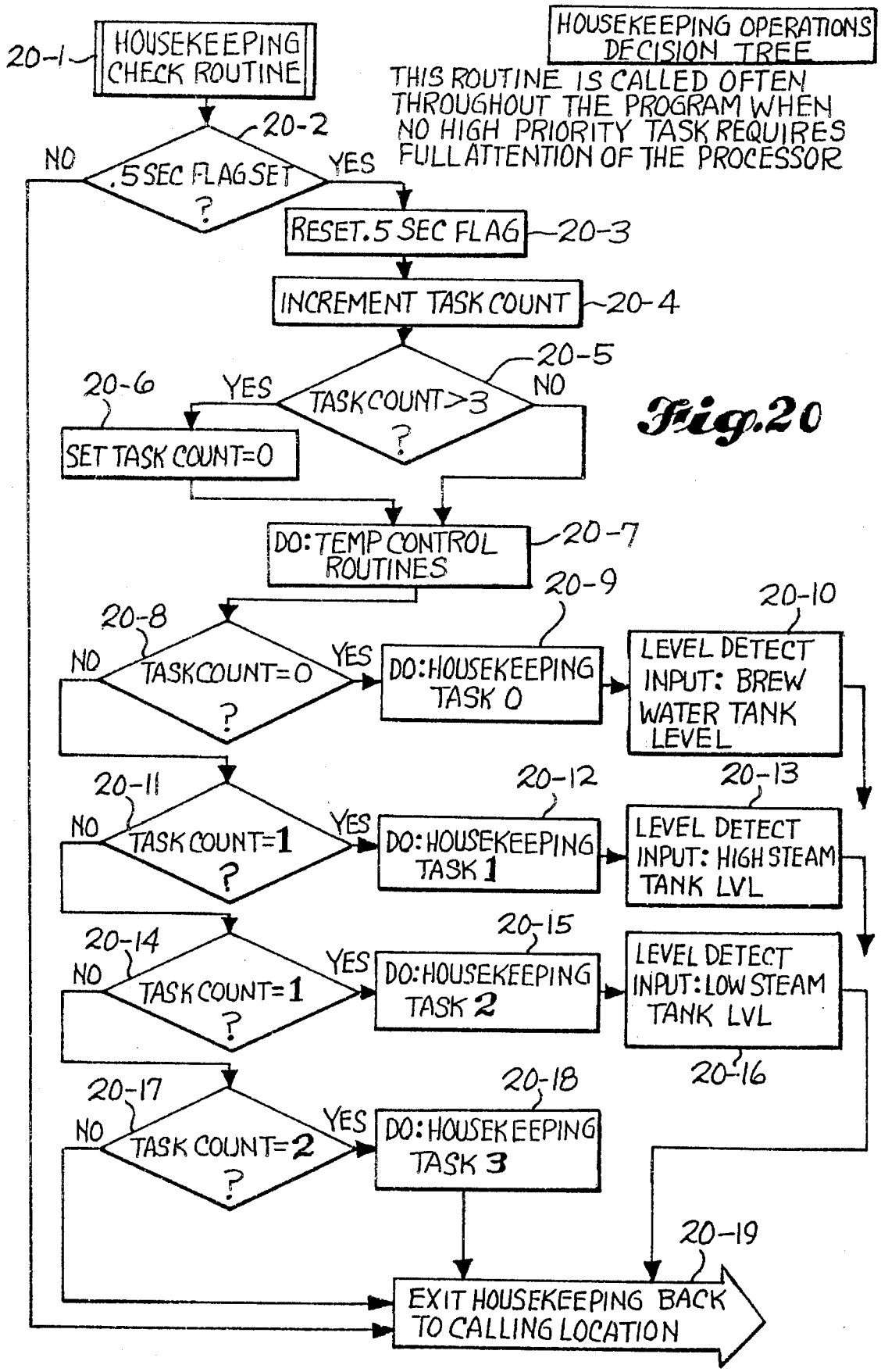
FIG. 20 is a flow diagram of the main housekeeping operations.

FIG. 20 is a flow diagram of the main housekeeping operations and consists of blocks 20-1 through 20-19. Temperature control routines are performed at block 20-7. Brew water tank level detection occurs at blocks 20-9 and 20-10. High steam tank level detection is performed at blocks 20-12 and 20-13. Low steam tank level detection occurs at blocks 20-15 and 20-16.

Figure 21A:
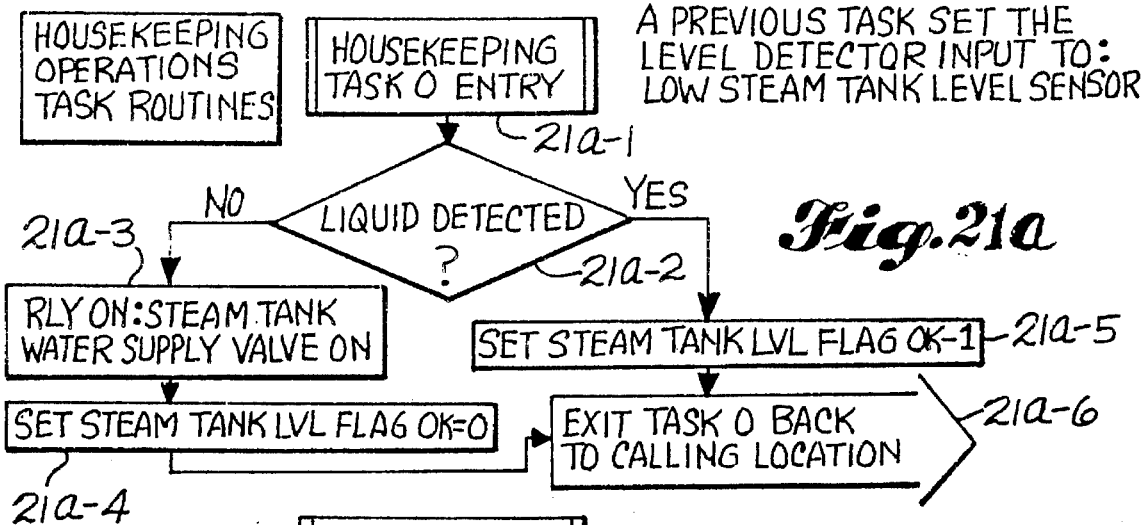
FIGS. 21a, 21b, 21c and 21d are related flow diagrams that operate in conjunction with the main housekeeping operations of FIG. 20 to ensure adequate water level in the brew water tank and the stem generator tank.

FIG. 21a is a flow diagram that operates in conjunction with the main housekeeping operations of FIG. 20 and details the routine for detecting low steam tank level. If no liquid is detected at block 21a-2, the relay to the steam tank water supply valve is activated at block 21a-3.

Figure 21B:
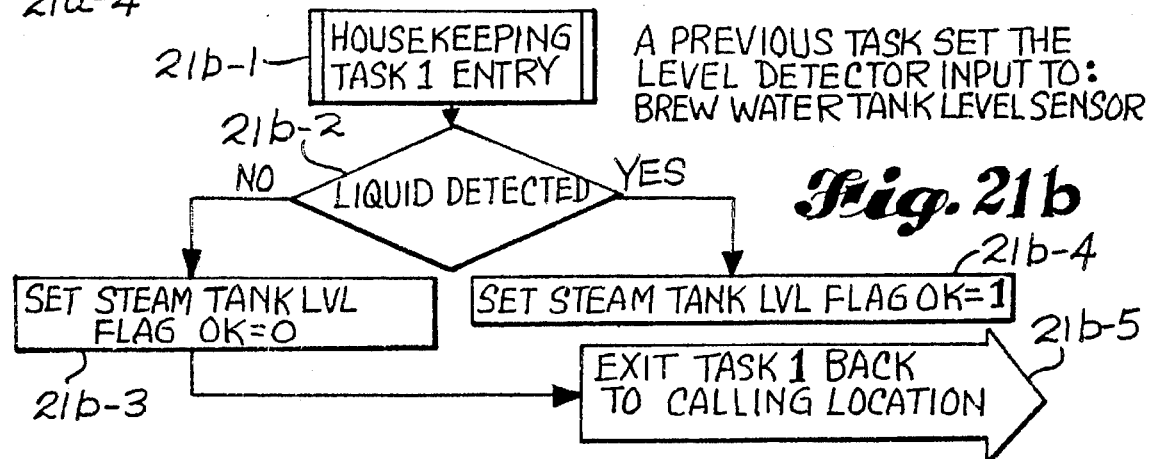

FIG. 21b is a flow diagram that operates in conjunction with the main housekeeping operations of FIG. 20 and details the routine for detecting the brew water tank level. If no liquid is detected at block 21b-2, the steam tank level flag is set to OK=0 at block 21b-3. If liquid is detected at block 21b-2, the steam tank level flag is set to OK=1 at block 21b-4.

Figure 21C:
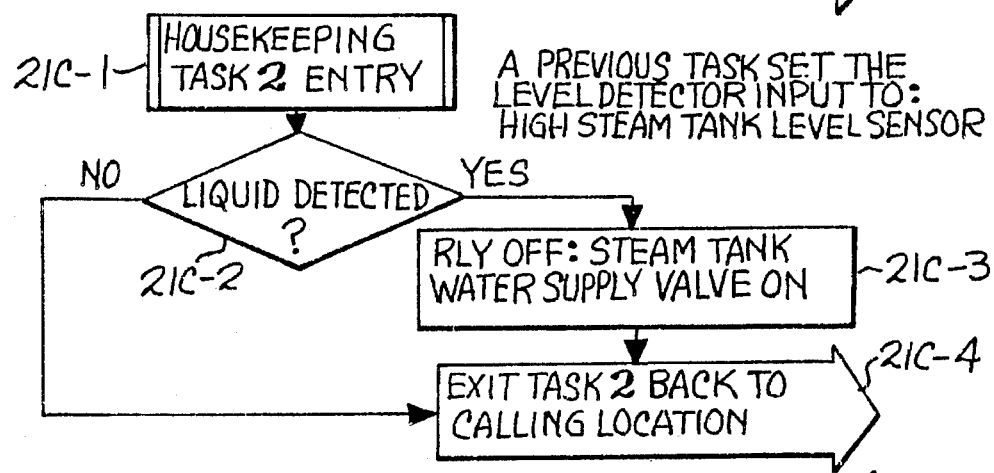

FIG. 21c is a flow diagram that operates in conjunction with the main housekeeping operations of FIG. 20 and details the routine for detecting high steam tank level. If liquid is detected at block 21c-2, the relay to the steam tank water supply valve is deactivated at block 21c-3.

Figure 21D:
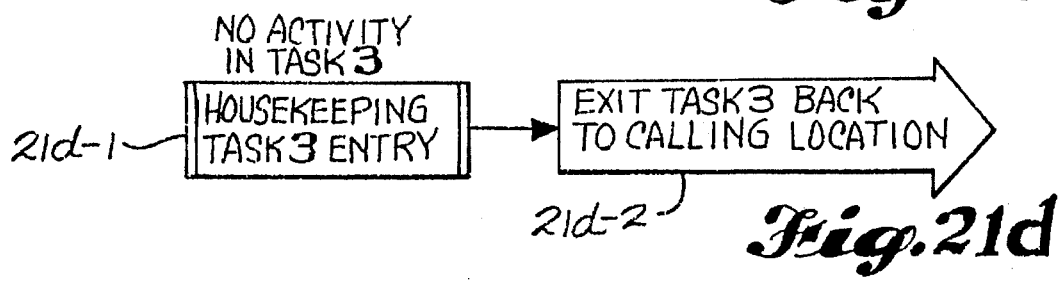

FIG. 21d is a flow diagram that operates in conjunction with the main housekeeping operations of FIG. 20 and details the routine for no housekeeping activity. A block 21d-2 shows exit back to the calling location.

Figure 22:
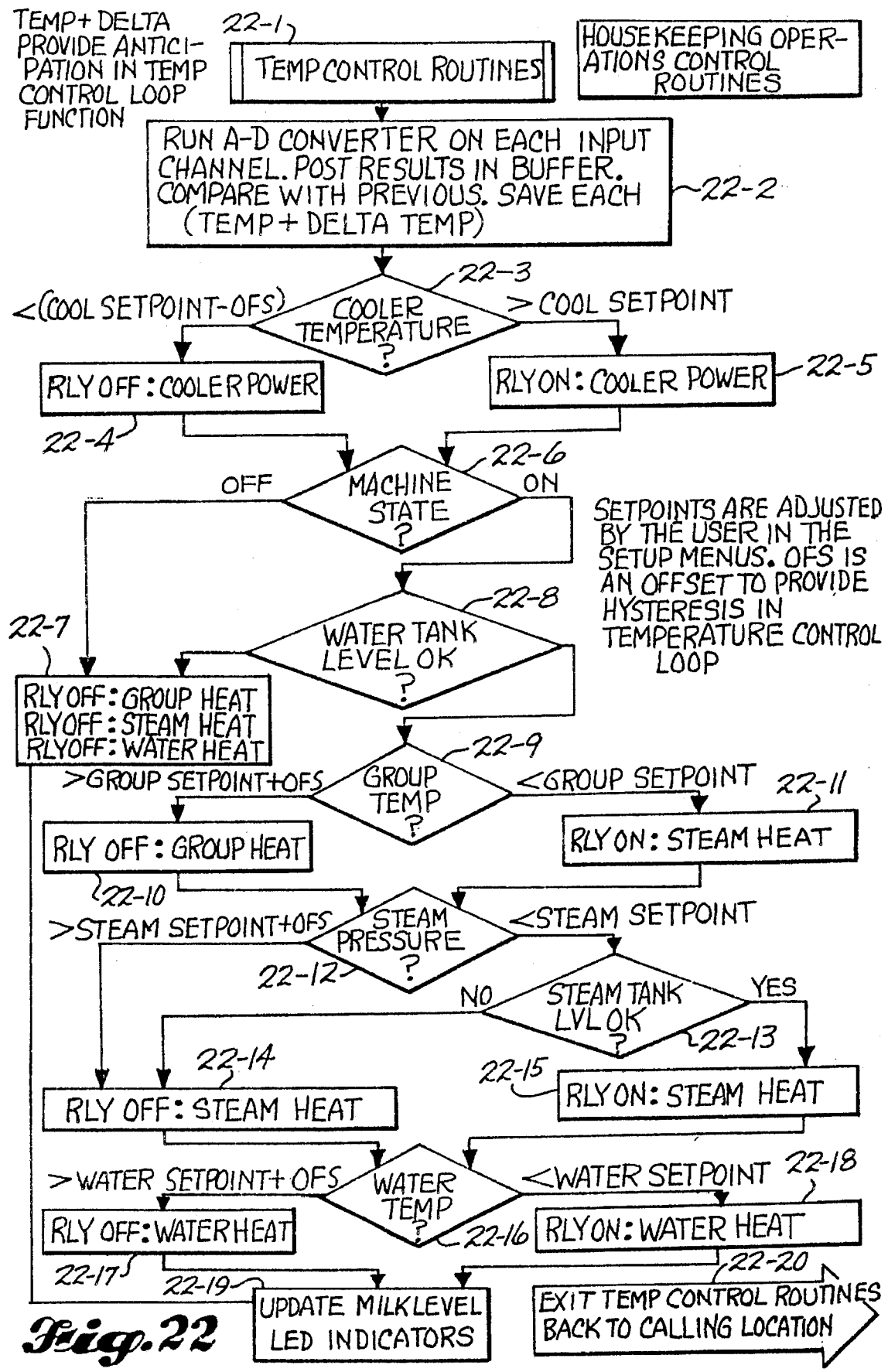
FIG. 22 is a flow diagram of the temperature control monitoring and regulation that also works in conjunction with the main housekeeping operations of FIG. 20.

FIG. 22 is a flow diagram of the temperature control monitoring and regulation that also works in conjunction with the main housekeeping operations of FIG. 20. If, at block 22-3, the temperature is greater than the cool set point, the relay to the cooler power is activated at block 22-5. If, however, the temperature is less than the cool set point, the relay to the cooler power is deactivated at block 22-4.

If the machine state is "on" on at block 22-6, water tank level is checked and corrected at block 22-8, group temperature is ascertained and modified at blocks 22-9 through 22-11, steam pressure is checked and modified at blocks 22-12 through 22-15 and water temperature is ascertained and corrected at blocks 22-16 through 22-18.

Figure 23:
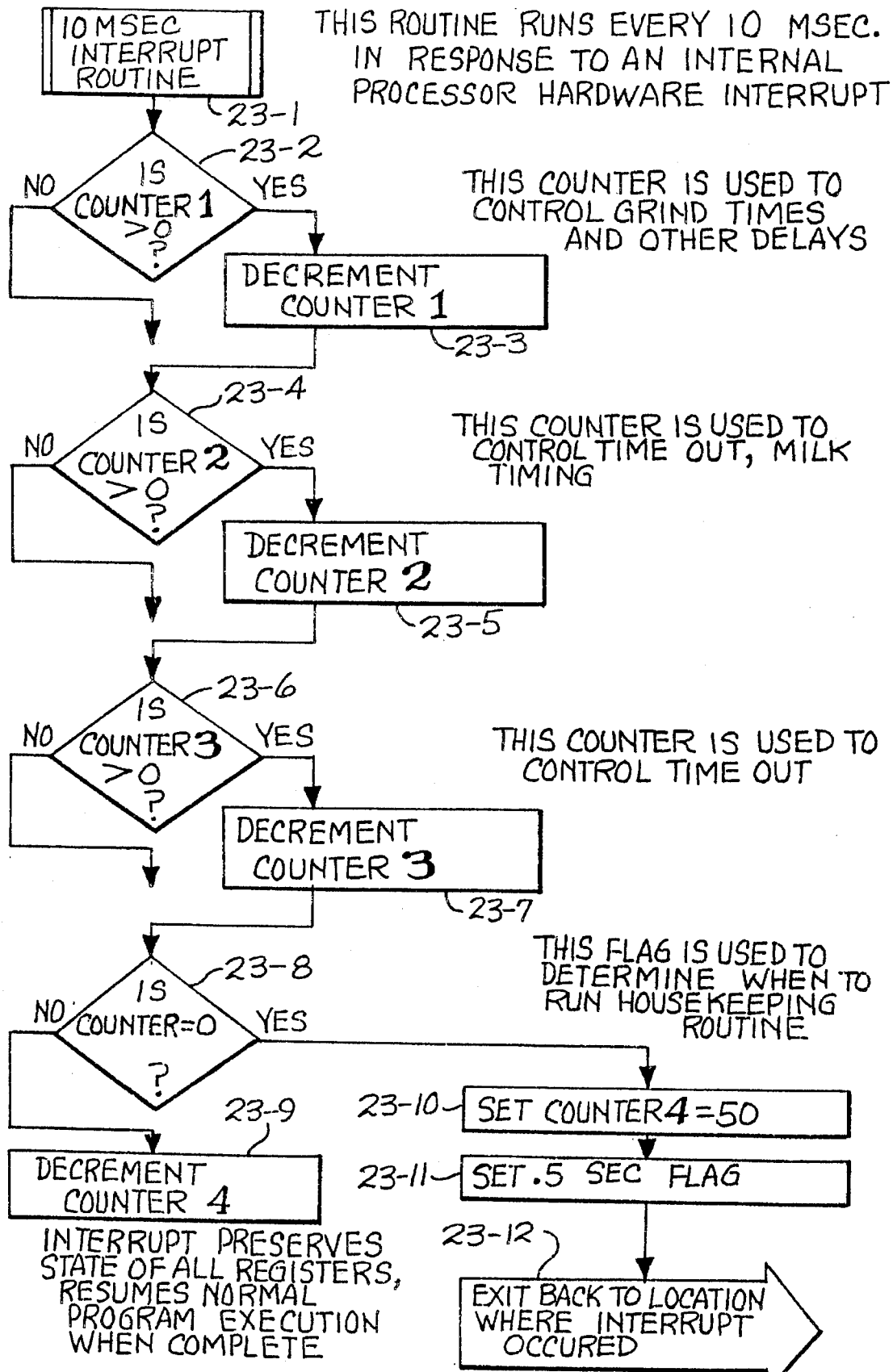
FIG. 23 is a flow diagram of various timing control routines.

FIG. 23 is a flow diagram of the timing control routine and is comprised of blocks 23-1 through 23-12. Block 23-3, decrement counter 1, controls grind times and other delays. Block 23-5, decrement counter 2, controls time out, milk timing, and other timed functions. Block 23-7, decrement counter 3, controls time and other timed functions. Block 23-9, decrement counter 4, also controls timed functions. Block 23-11, set 0.5 sec flag, determines when to run the housekeeping routine.

Hidden Menus Programs

As mentioned above, the hidden menus program is entered via the hidden menu key 9-18 shown on control panel 342 of FIG. 9 and provides for setting of various timing, temperature, volume parameters as well as retrieving and displaying cumulative statistics. Optionally, although not specifically shown, the hidden menu routines may provide for diagnostics to test the system in order to isolate malfunctioning modules and components.

Figure 24:
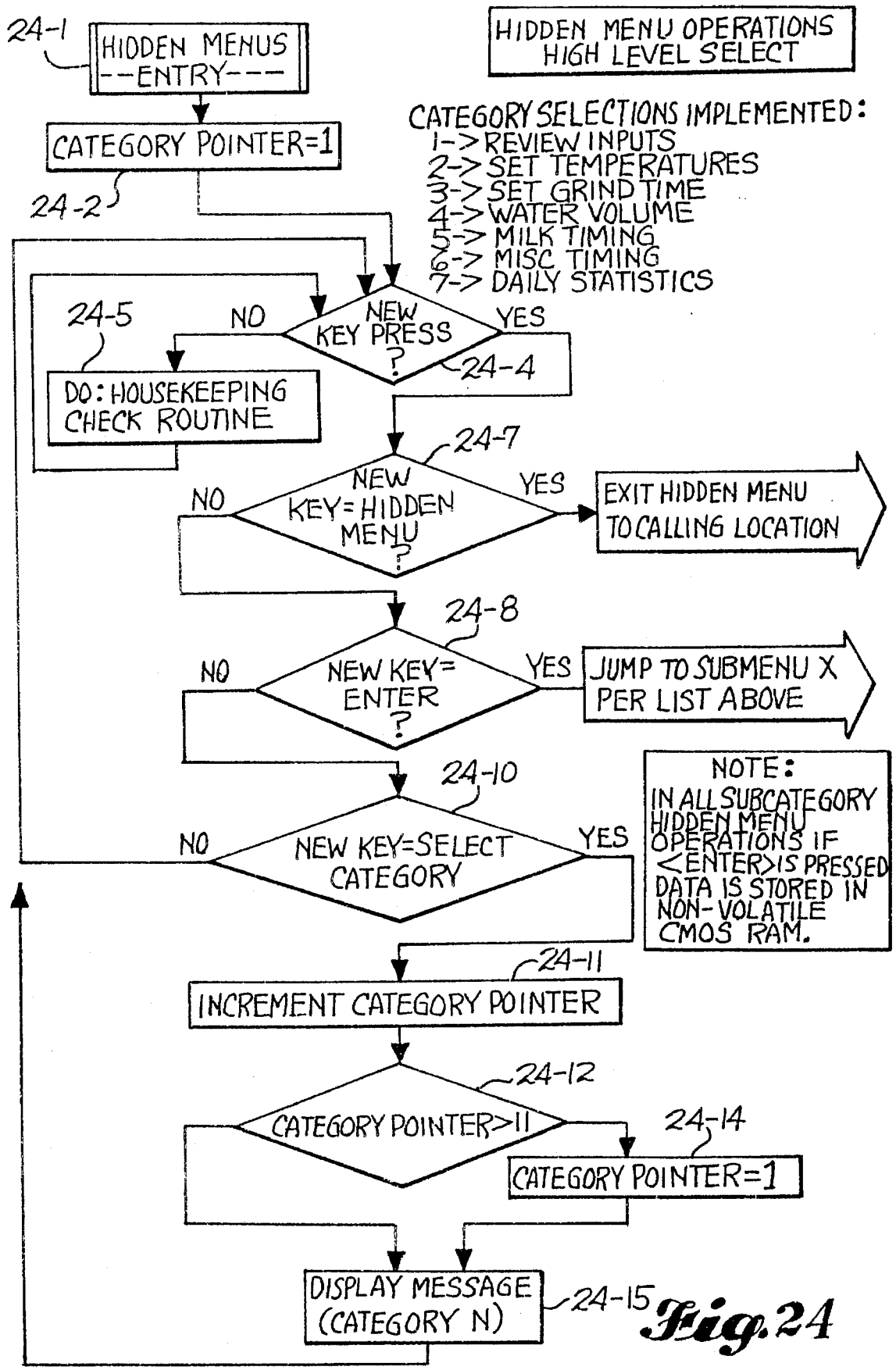

With reference to FIG. 24, the high level hidden menu routine is shown to include a series of blocks 24-1 through 24-15 that, through a sequence of operations of the hidden menu key 9-18, and other keys on the control panel in coordination with the prompts appearing in display window 9-16, enable the user to reach the desired control operation within the hidden menus. Thus, with successive key actuations, a new key enter decision block 24-8 causes the programming to jump to a sub-menu that includes in this embodiment multiple selection categories such as review inputs, set temperatures, set grind times, etc.

More specifically, by the series of decision blocks 24-4 through 24-12 in conjunction with the increment category pointer 24-11 that displays the categories available in display window 9-16, the user is prompted to select one of multiple sub-menu categories, examples of which are listed in FIG. 24, namely review inputs, set temperatures, set grind times, set water volume, set milk timing, set miscellaneous timing and daily statistics.

To implement these operations, actuation of the hidden menu key 9-18 is recognized by the programmed microprocessor 8-1 to cause access to the highest level hidden menu in FIG. 24. After entering the hidden menus, certain other keys on control panel 342, namely the pour key 9-14, the espresso single key 9-7, cappuccino double key 9-6, and espresso double 9-8 are used to select the available categories and set the parameters as follows: espresso single key 9-7 selects category; cappuccino double key 9-6 causes an "up" incrementing of the value of the selected category parameter, e.g., milk time; espresso double key 9-8 causes the selected category value to decrement; and the pour key 9-14 functions like an "enter" key to execute the instruction.

Figure 25:
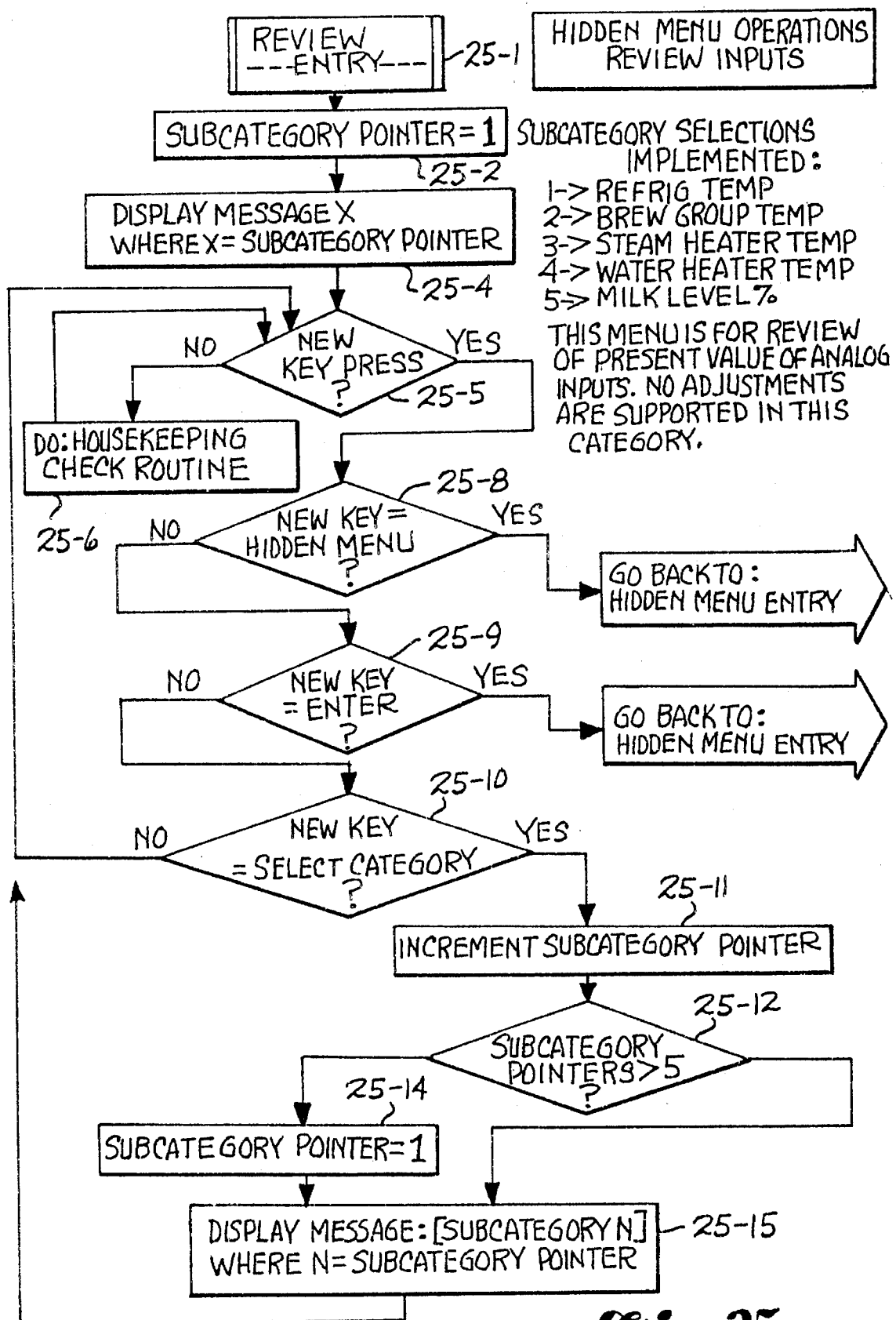

Assuming that the user has selected the sub-menu item: "review inputs", the program jumps to the flow diagram shown in FIG. 25, and the following operations are enabled. As shown in FIG. 25, the sequence of decision and instruction blocks 25-1 through 25-15, operating in conjunction with a message or prompt displayed in window 9-16 on control panel 342 provide a readout of: refrigeration temperature, brew group temperature, steam heater temperature, water heater temperature and milk level percentage (quantity of remaining refrigerated milk). At the conclusion of the review sequence, the review inputs routine of FIG. 25 causes the system to be returned to the basic hidden menu entry block 24-1 of FIG. 24 for further use of the high level hidden menu operations.

Figure 26:
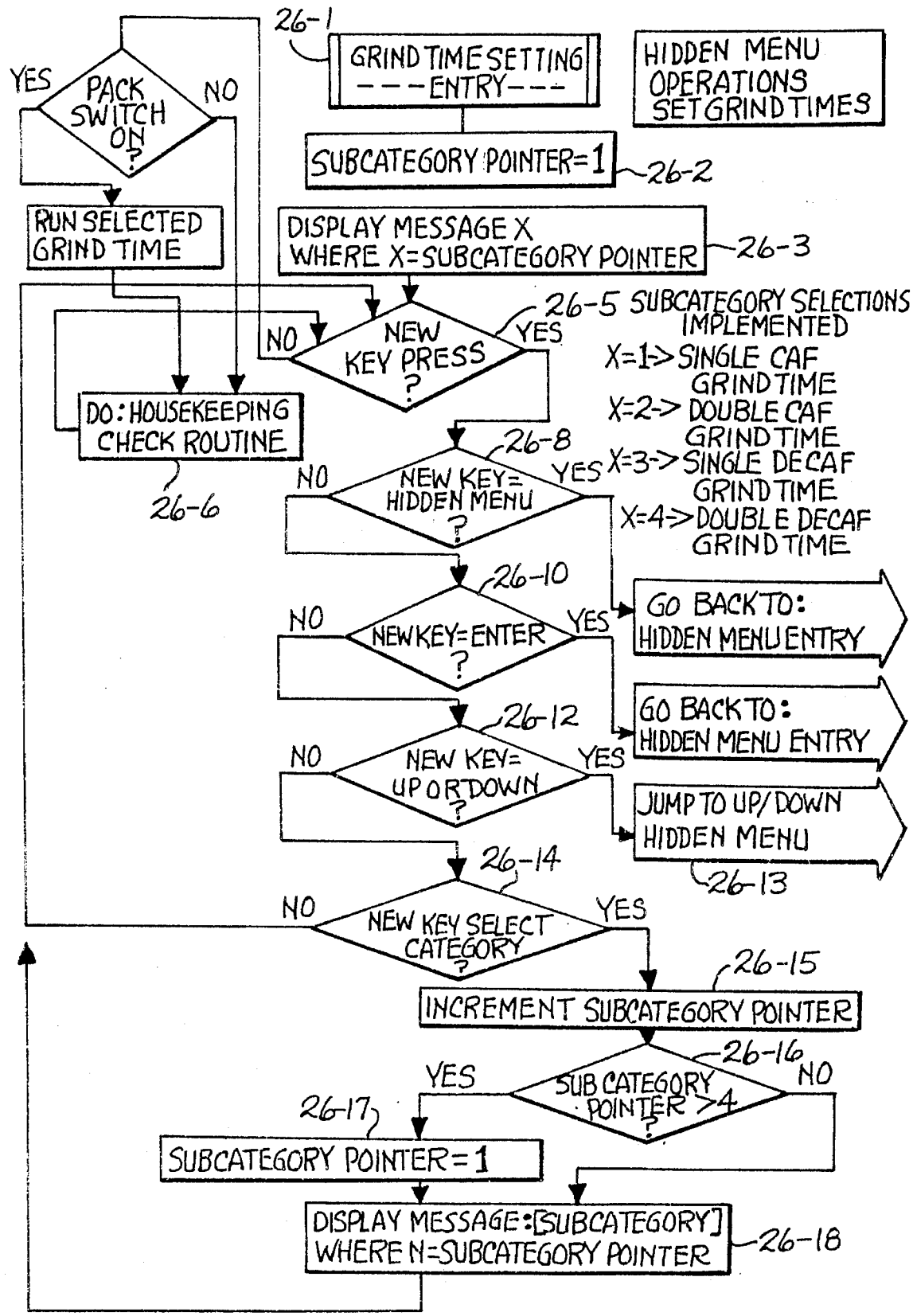
Figure 27:
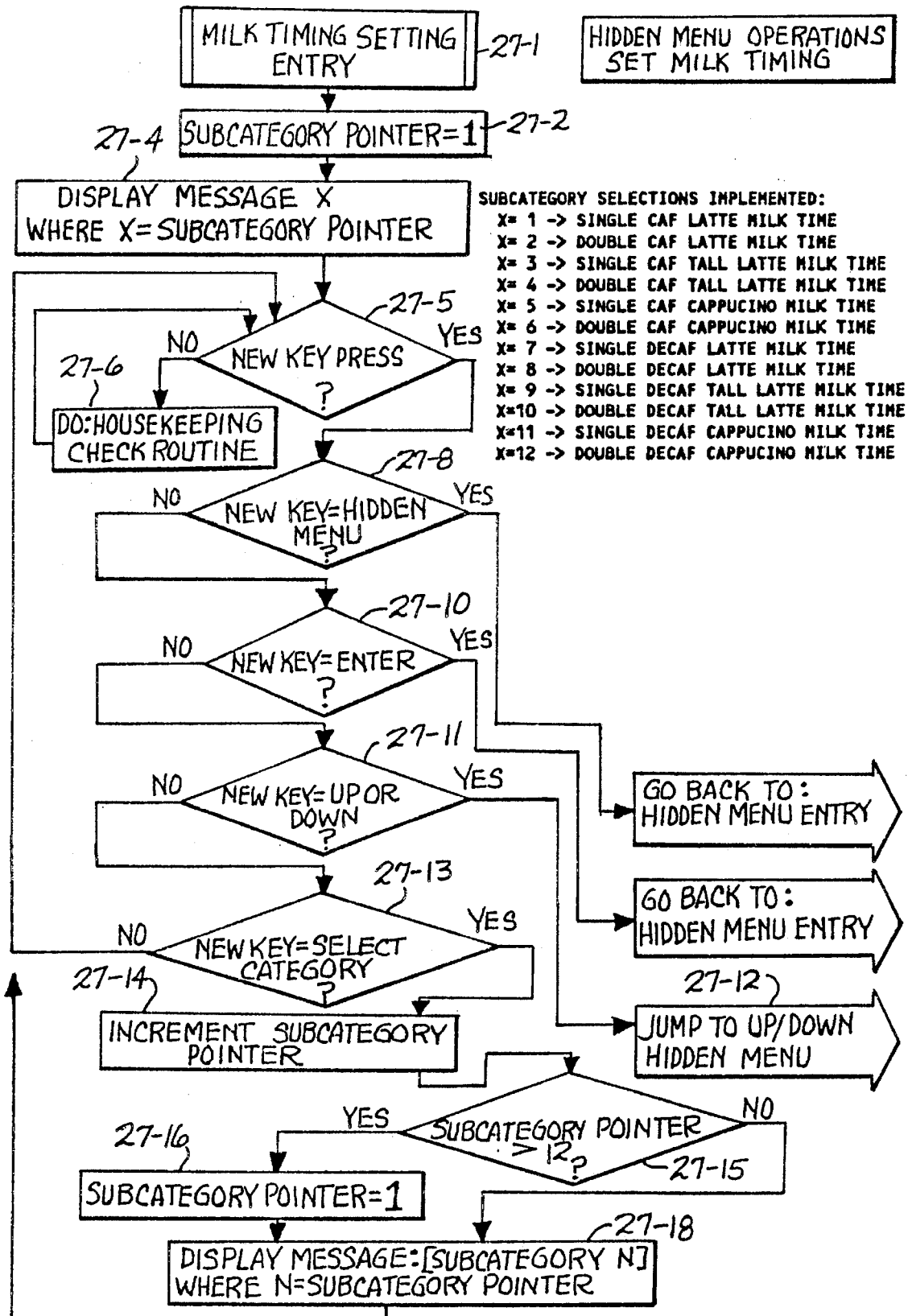
Figure 28:
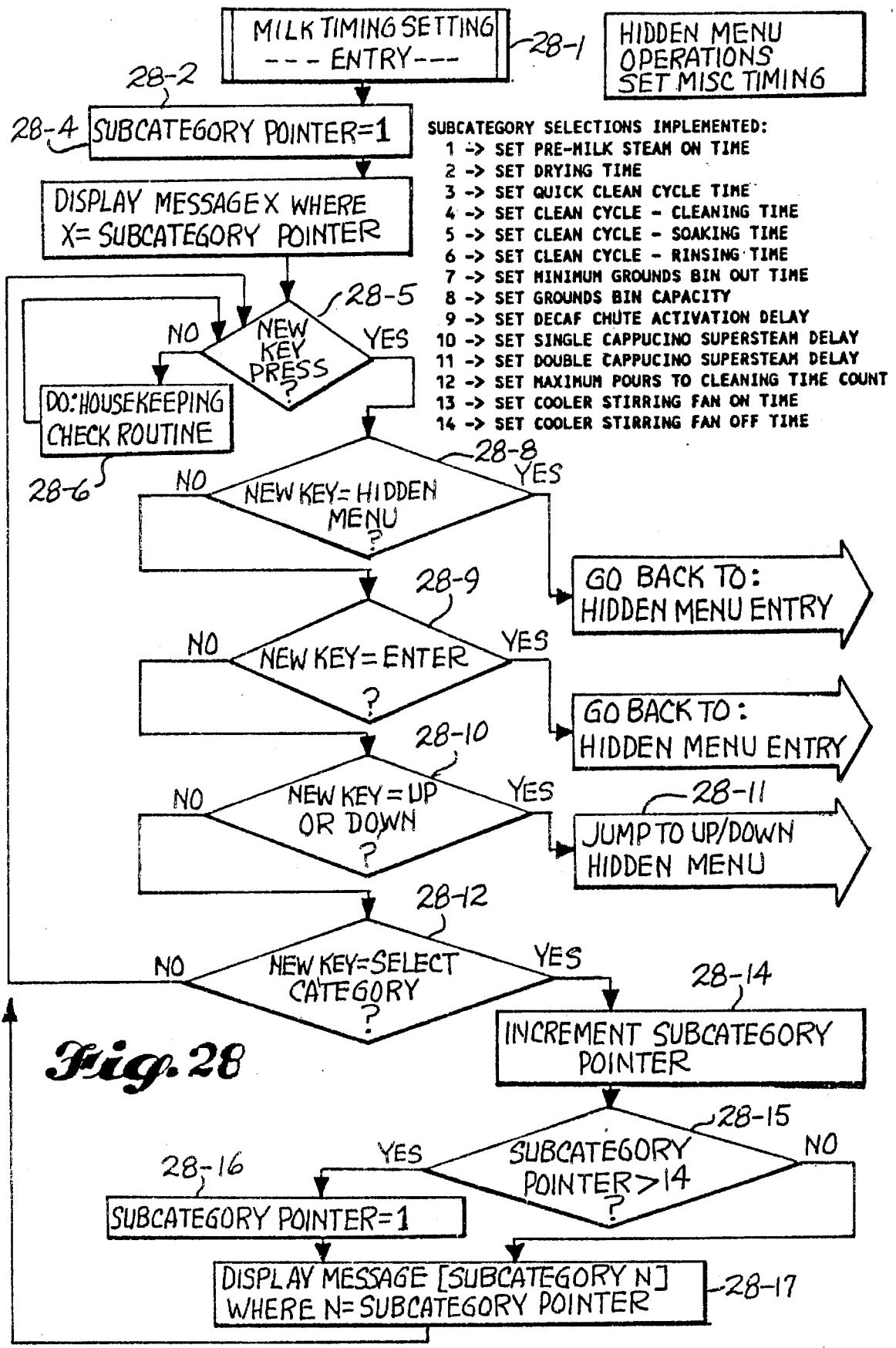

With reference to FIGS. 26, 27 and 28, one of the primary purposes of the hidden menu operations is to enable the user to set, and adjust when necessary, the basic timing, temperature, volume and other significant parameters that determine the characteristics and quality of the beverage. Thus, in FIG. 26, a flow diagram is shown of the hidden menu operations for setting the grind times that determine the quantity of the grounds that is to be delivered to the brewer assembly by the bean grinders to form the grounds pack. The process begins with the grind time setting entry block 26-1 and continues through a sequence of instruction and decision blocks 26-2 through 26-18 to display the sub-categories of the settable parameters. When the desired sub-category has been selected, the program jumps to an up/down hidden menu at 26-13 for changing the setting of the selected grind time. The sub-categories as indicated in FIG. 26 include the single and double caffeinated grind times and the single and double decaffeinated grind times for a total of four separate selectable sub-categories. Again, the sub-categories are selected by a sequence of operations of the panel keys described above in conjunction with the prompts and messages displayed in the window 9-16 of the operator control panel 342 (FIG. 9). The up/down hidden menu operations will be described in conjunction with the flow diagram of FIG. 29.

As another example of the parameter setting operations provided by the hidden menu, reference is made to FIG. 28 which shows the flow diagram for setting the milk timing operations. In this preferred embodiment, twelve different sub-categories are available as listed in the upper right hand corner of FIG. 7. These sub-categories are the various permutations of single and double, caffeinated and decaffeinated, regular and tall, and latte and cappuccino beverages as shown. The flow diagram itself is illustrated as being entered through a milk timing setting entry block 27-1 and proceeds through a series of instruction and decision blocks 27-2 on down to block 27-18 which displays the message of the selected sub-category in the display window 9-16 on the control panel. As in the case of the grind times select in FIG. 26, a sequence of operations of the above mentioned keys on the control panel in conjunction with the display 9-16 allows the operator to arrive at the desired sub-category and then jump, at instruction block 27-12, to the up/down hidden menu of FIG. 29 which in turn provides for the actual resetting procedure for the selected time parameter. For example, to set the milk injection time for a double caffeinated latte beverage, the operator uses the operations of FIG. 27 flow diagram to arrive at sub-category "X=2 double caffeinated latte milk time" which is displayed in the window 9-16 on control panel 342 and then with the jump to the up/down hidden menu, that particular time value can be adjusted up or down as explained below in connection with FIG. 29.

In FIG. 28, and similarly to FIGS. 26 and 27, an additional set of miscellaneous time settings are available for being reached through the hidden menu processing for resetting such time parameters as the pre-milk steam-on time, the clean cycle timing, the single cappuccino superstream delay and other miscellaneous time categories, a total of 14 of which are shown in the upper right hand of FIG. 28. The specific instruction and decision blocks of the miscellaneous timing menu of FIG. 26 include the entry block 28-1 and then a series of instruction and decision blocks 28-2 through 28-17. The operations here are essentially the same as described in connection with FIGS. 26 and 27, and upon reaching decision block 28-10 after the sub-category has been displayed and selected, the processor jumps to the up/down hidden menu at jump block 28-11 which in turn activates the up/down menu shown in FIG. 29 for resetting of the values listed in a selected one of the 14 sub-categories of FIG. 28.

Figure 29:
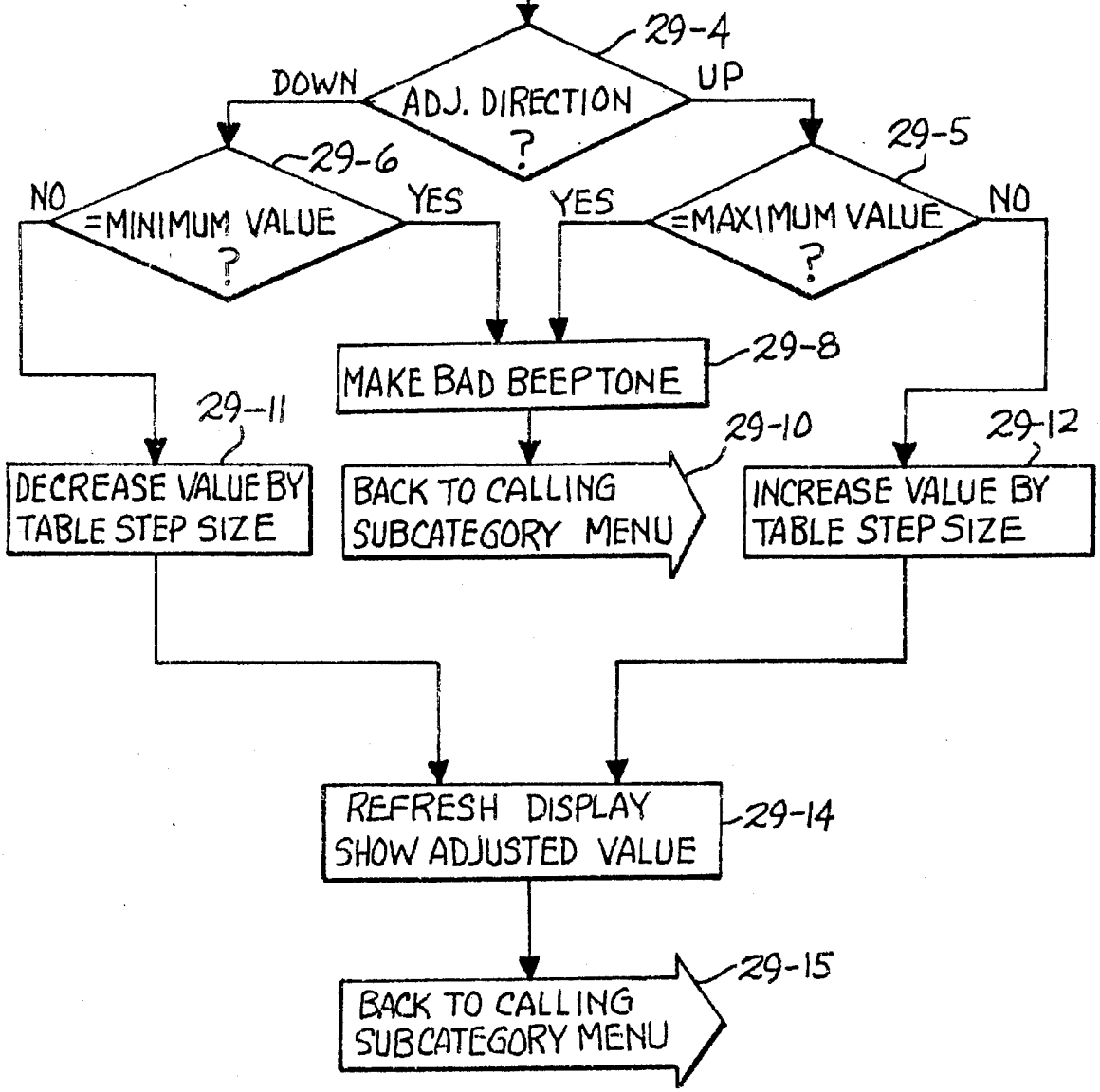

Now with reference to FIG. 29, the up/down menu itself is shown to include a series of instruction and decision blocks 29-1 through 29-15. The block 29-2 causes the processor to receive from look-up tables the existing setting and limits for the particular selected parameter, such as milk time, that is to be reset. The decision block 29-4 establishes the adjustment direction. Minimum and maximum limit blocks 29-6 and 29-5 limit the ranges of adjustment that can be made to the parameter. From decision blocks 29-6 and 29-5 assuming that the limits have not been exceeded, the value is decreased or increased, respectively, by blocks 29-11 and 29-12 and the display refreshed at block 29-14 to show the adjusted value. If the limits have been exceeded, a beep tone is sounded by block 29-8 and the operations will return to the calling sub-category menu.

For the sake of conciseness, not all of the adjustable parameter setting menus have been illustrated in the figures, In addition to those illustrated in FIGS. 26, 27 AND 28, there exists in the preferred embodiment the menus for setting water volume (determines the amount of brew water delivered to the brewer assembly), and temperature settings (establish the various temperature levels of the milk refrigeration, brew group temperature, steam heater temperature, and water heater temperature). Such additional hidden menu operations are implemented in essentially the same manner as shown for the grind times, milk timing, and miscellaneous timing routines of FIGS. 26, 27 and 28 and use the common up/down menu of FIG. 29 to adjust and hence reset the selected parameters. It will be appreciated that the hidden menu operations are not usually needed during each use of the beverage selection and pouring process. The hidden menu mode enables the manager, owner, or other supervising operator to reprogram the various parameter settings as may be desirable at infrequent intervals.

In addition to resetting parameter levels, the hidden menu operations also provide for retrieving various cumulative statistics. As an example, in the preferred embodiment, daily statistics are accumulated and retrieved using the hidden manu flow diagram of FIG. 30. As illustrated in that figure, a series of instruction and decision blocks commencing with entry block 30-1 and continuing through to display message block 30-18 provide for retrieving the quantities of each poured drink since the last power down. More specifically, the daily statistics review menu is entered through the basic hidden menu operations high level select of FIG. 24 and then the available sub-categories within the daily statistics menu are selected by a sequence of operations of the above mentioned keys in conjunction with the sub-categories displayed in window 9-16 of the control panel. For example, selection of category 4, "double caffeinated latte", enables the manager of the apparatus to retrieve the total quantity of double caffeinated latte beverages poured since the last power down, presumably being the last evening's closing.

It will be appreciated that the hidden menu statistics retrieval shown in FIG. 30 is an illustration of numerous statistical information that can be stored and retrieved using the programmed microprocessor of the master controller 340. For example, additional statistical options include manager statistics which enable the accumulation of quantities of drinks poured since a prior clearing operation performed by the machine manager which may span numerous days, weeks, or even months if desired. Similarly, total cumulative statistics can be stored and retrieved for display that will show the quantities of drinks poured since the apparatus was originally installed or for any other appropriate historical time period.

Further still, if desired, hidden menus may be provided for performing various diagnostics on the apparatus. Such a diagnostics menu may include a series of processing operations, again enabled through the hidden menu key in conjunction with the display window, to interrogate the status of various outputs or states of devices in the apparatus such as the output of the grind motors, brew water valve, milk valve, etc., which will normally be indicated as on or off states.

While only a particular embodiment of the method and apparatus of the invention has been disclosed herein, it will be readily apparent to persons skilled in the art that numerous changes and modifications can be made thereto, including the use of equivalent devices and method steps, without departing from the spirit of the invention. For example, although the master controller 340 disclosed above in the preferred embodiment is provided by a programmed microprocessor, an alternative to this embodiment may include hard wired logic, and/or programmable logic devices, such as programmable gate arrays. Such alternative implementations would provide the same or similar processing features as described above. Similarly, while a preferred form of the programming for microprocessor 8-1 is disclosed herein in FIGS. 10–30, it will be appreciated that different instructions and sequences may be employed without departing from the essential functions, features and method steps of the present invention. Further still, although the preferred embodiment uses a microprocessor that, when programmed by the contents of EPROM 8-3, performs dedicated operations, an alternative system may include a programmable general purpose computer, which may be a microcomputer, for performing the sequences of operations disclosed above in response to diskette or tape stored software programming.

We claim:

1. Beverage valve apparatus comprising:
    a venturi body having
        an inlet port of the character to receive pressurized venturi driving gas,
        an outlet port,
        a venturi throat extending between said inlet and outlet ports, and
        a milk injection port communicating with said venturi throat and of the character to receive liquid milk;
    electrically controlled pressurized gas valve means coupled to said inlet port;
    electrically controlled milk valve means coupled to said milk injection port; and
    electric controller means coupled to said pressurized gas valve means and to said milk valve means for operating said pressurized gas valve means and said milk valve means independently of each other.

2. The apparatus of claim 1 in which said electric controller means includes programmable timing means for operating said pressurized gas valve means and said milk valve means in the sequence of opening said gas valve means whereby said pressurized gas is drawn through said venturi body inlet port, opening said milk valve means whereby liquid milk is drawn through said milk injection port into said venturi throat, closing said milk valve means, and, after a predetermined delay, closing said pressurized gas valve means.

3. The apparatus of claim 2 which further includes refrigeration means disposed contiguously to said venturi body for maintaining said milk valve means and said liquid milk at predetermined, hygienically safe temperatures.

4. The apparatus of claim 2 which further includes mixer means coupled to said venturi body outlet port for mixing said liquid milk with said pressurized gas to form a suspended foam.

5. The apparatus of claim 4 in which said mixer means is a circular vortex mixer having an outlet dispensing port and having an inlet port connected to said outlet port of said venturi body.

6. The apparatus of claim 2 in which said pressurized gas valve means is at least one electrically operated steam valve.

7. The apparatus of claim 6 in which said at least one steam valve includes two independently controllable steam valves coupled in parallel between said inlet port and a source of steam whereby a selection of steam flow quantity is made by said controller.

8. The apparatus of claim 1 which further includes an ambient air art disposed in said venturi throat.

9. The apparatus of claim 8 which further includes electrically controlled air valve means coupled between said ambient air port and ambient air and being electrically coupled to said electric controller means.

10. The apparatus of claim 9 in which said air valve means includes flow adjustment means controlled by said electric controller means to permit a selection of air flow quantity through said air valve means.

\* \* \* \* \*